US012663694B2

(12) United States Patent (10) Patent No.: US 12,663,694 B2
Tseng et al. (45) Date of Patent: Jun. 23, 2026

(54) ADJUSTABLE APERTURE MODULE, IMAGING LENS MODULE, CAMERA MODULE AND ELECTRONIC DEVICE

(71) Applicant: LARGAN PRECISION CO., LTD., Taichung City (TW)

(72) Inventors: Te-Sheng Tseng, Taichung City (TW); Chia-Cheng Tsai, Taichung City (TW); Heng Yi Su, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 189 days.

(21) Appl. No.: 18/415,598

(22) Filed: Jan. 17, 2024

(65) Prior Publication Data

US 2025/0060653 A1 Feb. 20, 2025

Related U.S. Application Data

(60) Provisional application No. 63/533,448, filed on Aug. 18, 2023.

(51) Int. Cl.
*G03B 9/06* (2021.01)
(52) U.S. Cl.
CPC ...................................... *G03B 9/06* (2013.01)
(58) Field of Classification Search
CPC ....................................................... G03B 9/06
See application file for complete search history.

(56) References Cited

U.S. PATENT DOCUMENTS

| 5,993,079 A | * | 11/1999 | O'Brien | ................... | G03B 9/06 |
| | | | | | 355/71 |
| 8,861,098 B2 | * | 10/2014 | Ishimasa | ................... | G02B 7/08 |
| | | | | | 396/458 |
| 10,684,533 B2 | | 6/2020 | Chen et al. | | |

(Continued)

FOREIGN PATENT DOCUMENTS

| CN | 110346999 A | 10/2019 |
| CN | 115877633 A | 3/2023 |

(Continued)

OTHER PUBLICATIONS

EP Office Action dated Jul. 25, 2024 in application 24154324.8.

*Primary Examiner* — Noam Reisner
(74) *Attorney, Agent, or Firm* — Maschoff Brennan

(57) ABSTRACT

An imaging lens module includes an imaging lens, an adjustable aperture module, a first spacer and a second spacer. The adjustable aperture module is disposed between an object-side lens group and an image-side lens group of the imaging lens and comprises a blade assembly, fixed shafts, a movable component and a driving mechanism. The blade assembly includes at least two light-blocking blades forming a light pass aperture. The driving mechanism is to rotate the movable component in a circumferential direction, allowing the blade assembly to move relative to the fixed shafts for varying an aperture size of the light pass aperture. The fixed shafts are disposed on the first spacer. The second spacer and the first spacer together form an inner space in which the adjustable aperture module is accommodated. The second spacer receives and is in physical contact with the object-side lens group.

29 Claims, 25 Drawing Sheets

(56)     References Cited

U.S. PATENT DOCUMENTS

| | | | |
|---|---|---|---|
| 2016/0091690 A1* | 3/2016 | Nakajima .............. | G02B 7/026 |
| | | | 359/754 |
| 2017/0357144 A1* | 12/2017 | Kim ....................... | H04N 23/55 |
| 2019/0317257 A1* | 10/2019 | Chang .................... | G02B 5/223 |
| 2020/0064711 A1* | 2/2020 | Kim ......................... | G03B 9/06 |
| 2021/0157216 A1* | 5/2021 | Cohen .................... | G02B 7/102 |

FOREIGN PATENT DOCUMENTS

| | | | |
|---|---|---|---|
| KR | 20170123048 A | 11/2017 |
| WO | 2023103435 A1 | 6/2023 |

* cited by examiner

ADJUSTABLE APERTURE MODULE, IMAGING LENS MODULE, CAMERA MODULE AND ELECTRONIC DEVICE

RELATED APPLICATIONS

This application claims priority to U.S. Provisional Application 63/533,448, filed on Aug. 18, 2023, which is incorporated by reference herein in its entirety.

BACKGROUND

Technical Field

The present disclosure relates to an adjustable aperture module, an imaging lens module, a camera module and an electronic device, more particularly to an adjustable aperture module, an imaging lens module and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, compact camera modules have been applied in various fields, such as portable devices (e.g., smartphones, action cameras), augmented reality and virtual reality head-mounted devices or aerial cameras. Moreover, the hardwares of the compact camera modules has been continuously upgraded, such as larger image sensors and imaging lenses with higher image quality. However, using larger image sensors can provide users with better image quality but may result in background blurring. A conventional adjustable aperture module can be used to adjust the degree of background blurring and control the amount of light entering the imaging lens. However, due to size limitations, it is difficult for the camera modules to be equipped with adjustable aperture modules. Specifically, existing designs of the conventional adjustable aperture modules encounter several issues when applied to compact camera modules. These issues include susceptibility to damage for downsized aperture blades, excessive weight, inability to meet precision requirements (such as aperture size and positioning accuracy of light pass aperture), and difficulty in achieving compactness.

SUMMARY

According to one aspect of the present disclosure, an imaging lens module includes an imaging lens, an adjustable aperture module, a first spacer and a second spacer. The imaging lens includes an object-side lens group and an image-side lens group, and an optical axis of the imaging lens passes through the object-side lens group and the image-side lens group. The adjustable aperture module is disposed between the object-side lens group and the image-side lens group, and the adjustable aperture module includes a blade assembly, a plurality of fixed shafts, a movable component and a driving mechanism. The blade assembly includes at least two light-blocking blades overlapping one another, and the light-blocking blades are arranged in a circumferential direction surrounding the optical axis and together form a light pass aperture. The optical axis passes through the light pass aperture. The fixed shafts are disposed corresponding to the blade assembly, and the movable component is disposed corresponding to the blade assembly. The driving mechanism is configured to rotate the movable component in the circumferential direction, allowing the blade assembly to move relative to the fixed shafts for varying an aperture size of the light pass aperture. The fixed shafts are disposed on the first spacer. The second spacer is disposed corresponding to the first spacer. In addition, the first spacer and the second spacer are coupled to each other and together form an inner space in which the adjustable aperture module is accommodated. Preferably, the second spacer receives the object-side lens group and is in physical contact with the object-side lens group.

According to another aspect of the present disclosure, an imaging lens module includes an imaging lens, an adjustable aperture module, a first spacer and a second spacer. The imaging lens includes an object-side lens group and an image-side lens group, and an optical axis of the imaging lens passes through the object-side lens group and the image-side lens group. The adjustable aperture module is disposed between the object-side lens group and the image-side lens group, and the adjustable aperture module includes a blade assembly, a plurality of fixed shafts, a movable component and a driving mechanism. The blade assembly includes at least two light-blocking blades overlapping one another, and the light-blocking blades are arranged in a circumferential direction surrounding the optical axis and together form a light pass aperture. The optical axis passes through the light pass aperture. The fixed shafts are disposed corresponding to the blade assembly, and the movable component is disposed corresponding to the blade assembly. The driving mechanism is configured to rotate the movable component in the circumferential direction, allowing the blade assembly to move relative to the fixed shafts for varying an aperture size of the light pass aperture. The fixed shafts are disposed on the first spacer. The second spacer is disposed corresponding to the first spacer. In addition, the first spacer and the second spacer are coupled to each other and together form an inner space in which the adjustable aperture module is accommodated. Preferably, the first spacer receives the image-side lens group and is in physical contact with the image-side lens group.

According to another aspect of the present disclosure, a camera module includes the aforementioned imaging lens module and an image sensor. The image sensor is disposed on an image surface of the imaging lens module.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
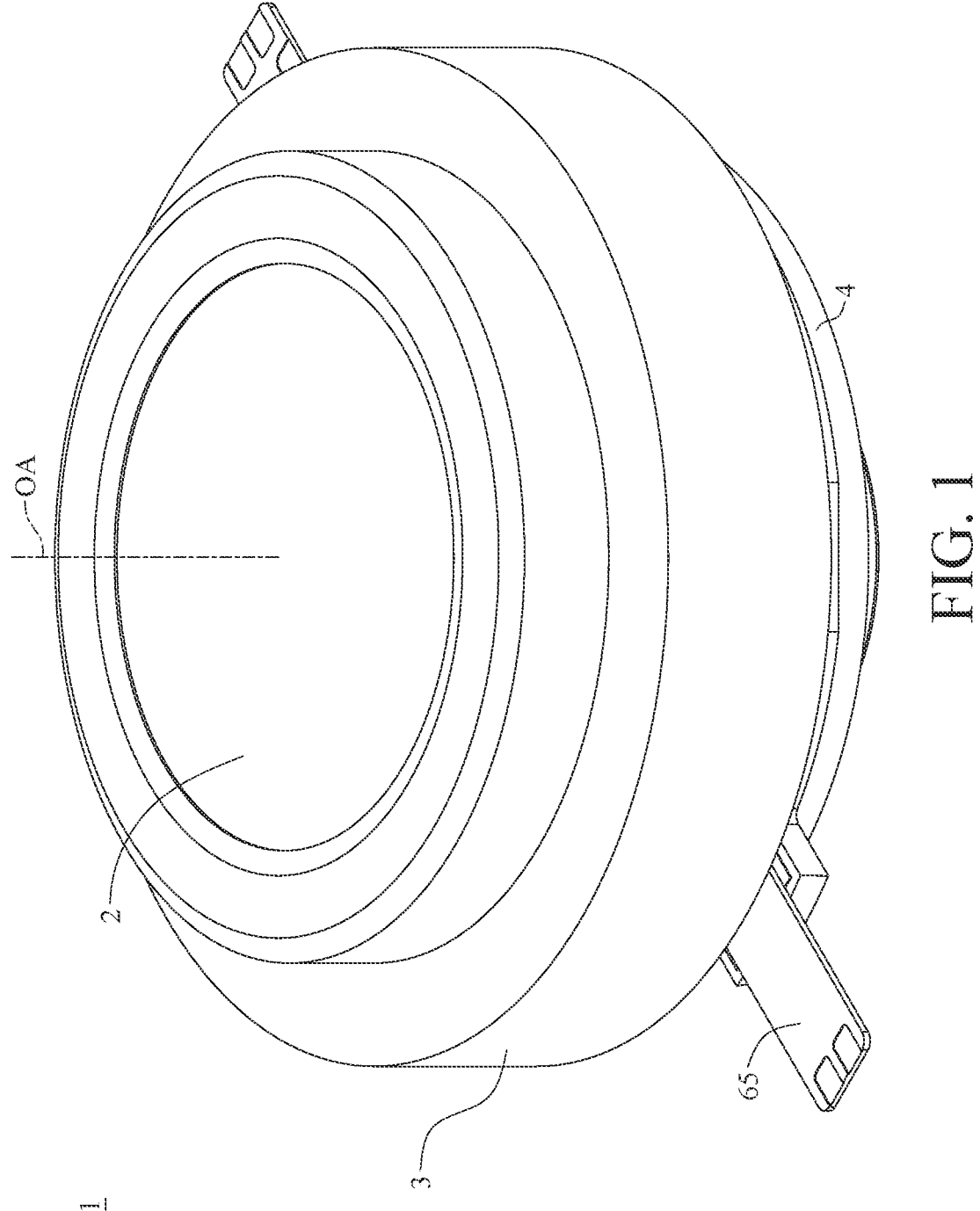
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module. The imaging lens module includes an imaging lens, an adjustable aperture module, a first spacer and a second spacer. The imaging lens includes an object-side lens group and an image-side lens group, and an optical axis of the imaging lens passes through the object-side lens group and the image-side lens group.

The adjustable aperture module is disposed between the object-side lens group and the image-side lens group, and the adjustable aperture module includes a blade assembly, a plurality of fixed shafts, a movable component and a driving mechanism. The blade assembly includes at least two light-blocking blades overlapping one another, the light-blocking blades are arranged in a circumferential direction surrounding the optical axis and together form a light pass aperture whose aperture size is adjustable, and the optical axis of the imaging lens passes through the light pass aperture. The fixed shafts are disposed corresponding to the blade assembly, and the movable component is disposed corresponding to the blade assembly. The driving mechanism is configured to rotate the movable component in the circumferential direction, allowing the blade assembly to move relative to the fixed shafts for varying the aperture size of the light pass aperture. The object-side lens group is located at an object side of the adjustable aperture module and includes one or more lens elements, and the image-side lens group is located at an image side of the adjustable aperture module and includes one or more lens elements. Moreover, the present disclosure is not limited to the number of lens elements in a single lens group.

The fixed shafts are disposed on the first spacer, and the second spacer is disposed corresponding to the first spacer. In addition, the first spacer and the second spacer are coupled to each other and together form an inner space in which the adjustable aperture module is accommodated. Moreover, the first spacer can be disposed on the image side of the adjustable aperture module, and the optical axis passes through a center of the first spacer, but the present disclosure is not limited thereto. Moreover, the second spacer can be disposed on the object side of the adjustable aperture module, and the optical axis passes through a center of the second spacer, but the present disclosure is not limited thereto. Moreover, the first spacer and second spacer can be made of plastic material, metallic material or a combination thereof, but the present disclosure is not limited thereto.

In one configuration, the second spacer can receive the object-side lens group and can be in physical contact with the object-side lens group. Therefore, it is favorable for the object-side lens group to be aligned with the optical axis for ensuring assembly quality.

In another configuration, the first spacer can receive the image-side lens group and can be in physical contact with the image-side lens group. Therefore, it is favorable for the image-side lens group to be aligned with the optical axis for ensuring assembly quality.

According to the present disclosure, by configuring the adjustable aperture module within the imaging lens module, it is possible to vary the aperture size of the light pass aperture to accommodate different amounts of incident light in various shooting environments, thereby enhancing image quality. Furthermore, through the arrangement of the spacers, fixed shafts, lens groups, and the adjustable aperture module as described above, spatial efficiency of the imaging lens module is improved, resulting in a more compact module When an axial distance between the object-side lens group and the image-side lens group is T, and a difference in area between a maximum size of the light pass aperture and a minimum size thereof is ΔA, the following condition can be satisfied: $0.1 < T/\sqrt{\Delta A} < 0.9$. Therefore, it is favorable for the adjustable aperture module to have a range of the proportion for better shading effects. Please refer to FIG. 11, which shows a schematic view of the axial distance T between the object-side lens group 21 and the image-side lens group 22 according to the 1st embodiment of the present disclosure. Please also refer to FIG. 12 and FIG. 14, which respectively show top views of some components of the imaging lens module when the adjustable aperture module of the imaging lens module is in a maximum aperture state and a minimum aperture state according to the 1st embodiment of the present disclosure, where the area of the light pass aperture LPH in a maximum size state is A1 (corresponding to FIG. 12), the area of the light pass aperture LPH in a minimum size state is A2 (corresponding to FIG. 14), and the difference in area between the maximum size and the minimum size of the light pass aperture LPH is ΔA; that is, $\Delta A = A1 - A2$.

When a maximum field of view of the imaging lens module is FOV, the following condition can be satisfied: 85 degrees<FOV<210 degrees. Therefore, it is favorable for meeting the shooting requirements of ultra-wide-angle imaging lenses. Moreover, the maximum field of view (FOV) of the imaging lens module can be 157.9 degrees, 179.3 degrees or 198 degrees, and the present disclosure is not limited thereto.

The adjustable aperture module can further include at least one rollable element, a fixed aperture element and a printed circuit board. Moreover, the rollable element can be disposed between the first spacer and the movable component. When the driving mechanism drives the movable component to rotate in the circumferential direction, the rollable element provides the movable component with a rotational degree of freedom relative to the first spacer. The fixed aperture element is disposed between the object-side lens group and the image-side lens group, and the fixed aperture element and the blade assembly are disposed adjacent to each other to define a constant f-number. Furthermore, the printed circuit board is disposed corresponding to the driving mechanism and electrically connected to the driving mechanism. Therefore, it is favorable for balancing drive efficiency and optical performance for an optimal configuration. Moreover, the printed circuit board can be a flexible printed circuit board, but the present disclosure is not limited thereto.

The fixed aperture element can include a central opening, and the optical axis of the imaging lens passes through the central opening. Moreover, there can be no additional optical lens element disposed between the central opening of the fixed aperture element and the light pass aperture formed by the blade assembly.

The first spacer can include a notch structure, and the notch structure allows the printed circuit board to pass therethrough, such that the printed circuit board can be electrically connected to external devices (e.g., circuits of external devices).

The second spacer can include a protruding structure, and the protruding structure and the notch structure of the first spacer are disposed opposite to each other. Moreover, the notch structure and the protruding structure are disposed opposite to each other and form a passage therebetween allowing the printed circuit board to pass therethrough. Therefore, by arranging the notch structure and the protruding structure opposite to each other to create a passage for a flat printed circuit board to pass through, the design complexity of the printed circuit board is reduced. Please refer to FIG. 8, which shows a schematic view of the passage PT formed between the notch structure 40 and the protruding structure 50 according to the 1st embodiment of the present disclosure.

The driving mechanism can include at least one coil and at least one magnet, the coil is disposed on the printed circuit board, and the magnet is disposed on the movable component. Therefore, it is favorable for the driving mechanism to have a configuration for better driving efficiency.

The rollable element and the magnet are arranged along the circumferential direction, and two sides of the magnet, in both a clockwise direction and a counterclockwise direction, are adjacent to the rollable element. Therefore, it is favorable for ensuring a more stable balance of the movable component relative to the first spacer during rotation.

When a length of each magnet in the circumferential direction is Lm, and a maximum outer diameter of the movable component is Dm, the following condition can be satisfied: $0.1 < Lm/Dm < 0.8$. Therefore, compared to the conventional two-stage variable aperture, a stage-less continuous variable aperture allows for multiple fine adjustments to the incident light of the imaging lens, enhancing optical design flexibility. Moreover, in some configurations, using an extended magnet is favorable for achieving the functionality of a stage-less continuous variable aperture. Please refer to FIG. 7, which shows a schematic view of the length Lm of one magnet 662 in the circumferential direction D1 and the maximum outer diameter Dm of the movable component 62 according to the 1st embodiment of the present disclosure.

When a distance between the light pass aperture and an image-side surface of a most image-side lens element in the image-side lens group in a direction parallel to the optical axis is SD, and a distance between an object-side surface of a most object-side lens element in the object-side lens group and the image-side surface of the most image-side lens element in the image-side lens group in the direction parallel to the optical axis is TD, the following condition can be satisfied: $0 < SD/TD < 0.9$. Therefore, it is favorable for the adjustable aperture module to have a wider range of proportion for better shading effects. Please refer to FIG. 11, which shows a schematic view of SD and TD according to the 1st embodiment of the present disclosure.

The imaging lens can further include an IR-cut coating disposed on one lens surface of one lens element of the object-side lens group. Therefore, the IR-cut coating can filter out excess infrared light, achieving clearer imaging pictures. Said one lens surface of one lens element can be one of an object-side surface and an image-side surface of the lens element.

One lens element of the image-side lens group can be mad of IR-cut material. Therefore, the IR-cut material can filter out excess infrared light, achieving clearer imaging pictures.

According to the present disclosure, the imaging lens module can further include a retainer and an O-ring. The retainer is disposed on an object side of the imaging lens, and the retainer is in physical contact with the most object-side lens element of the object-side lens group. In addition, the O-ring can be disposed between the retainer and the second spacer, or between the object-side lens group and the second spacer, so that by the configuration of the O-ring, external moisture and dust can be prevented from entering the imaging lens. Therefore, it is favorable for enhancing the environmental adaptability and durability of the imaging lens module.

According to the present disclosure, a camera module is provided. The camera module includes the aforementioned imaging lens module and an image sensor. The image sensor is disposed on an image surface of the imaging lens module.

According to the present disclosure, an electronic device is provided. The electronic device includes the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
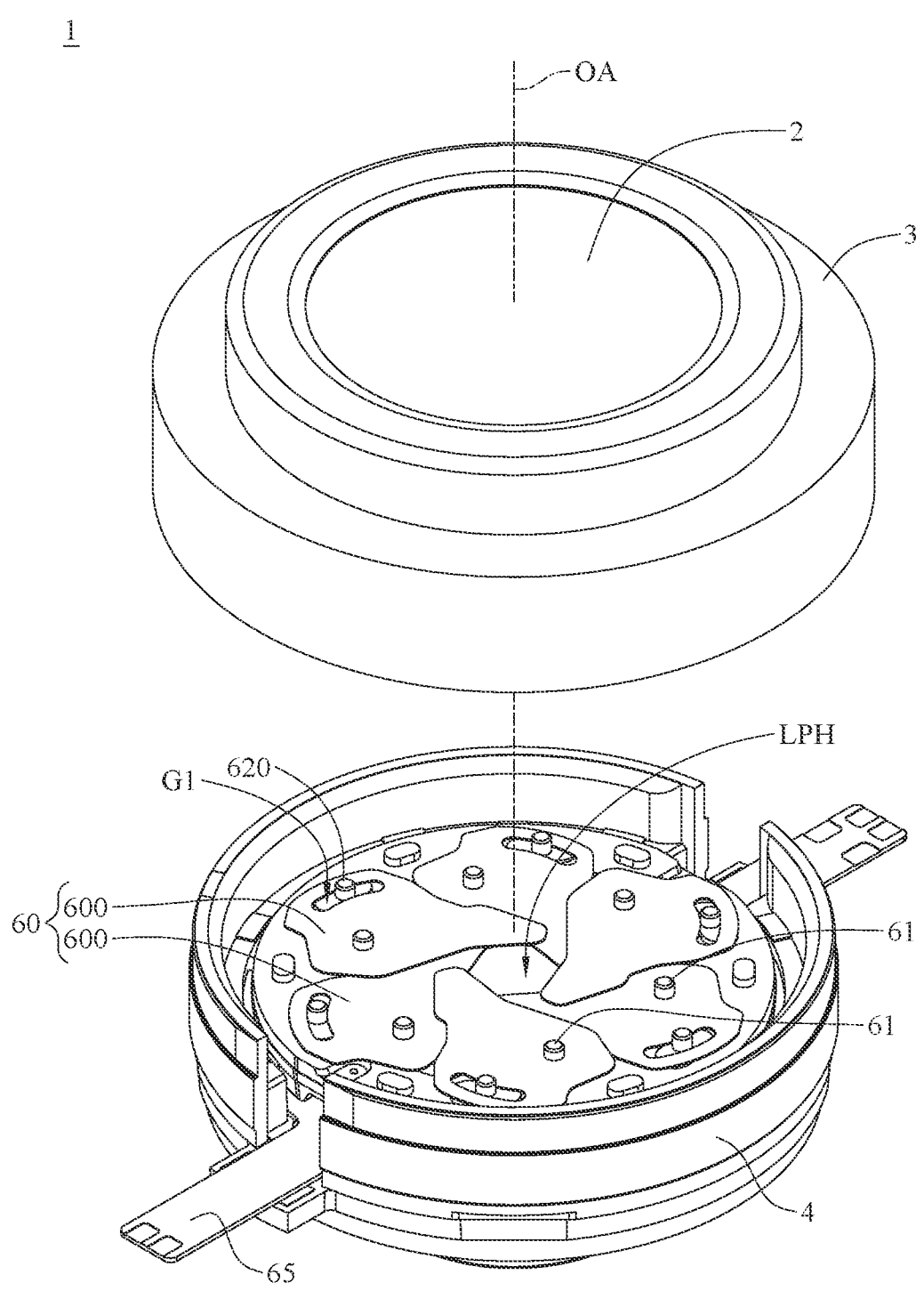
FIG. 2 is a partial exploded view of the imaging lens module in FIG. 1.
Figure 3:
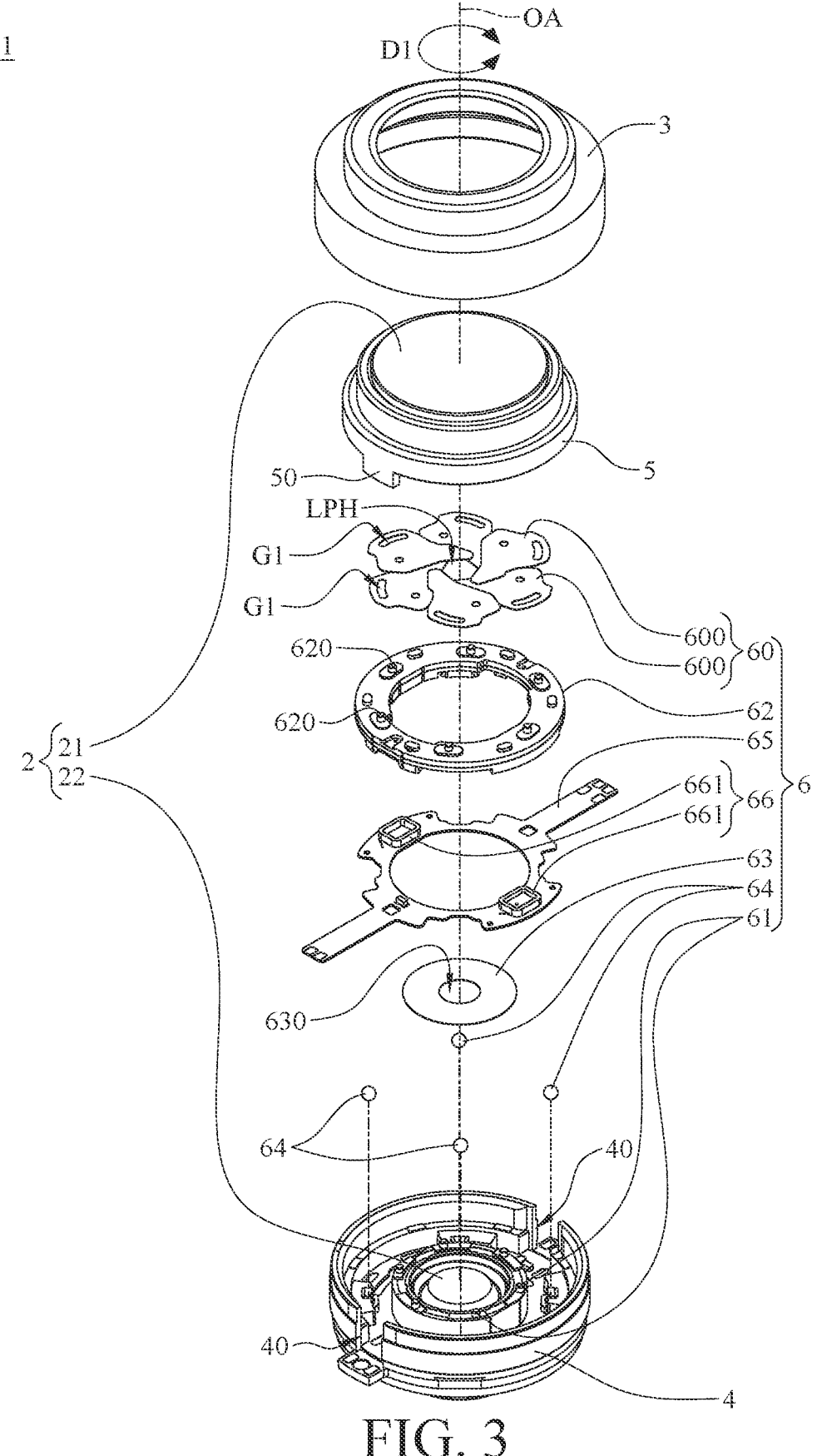
FIG. 3 is a further exploded view of the imaging lens module in FIG. 2.
Figure 4:
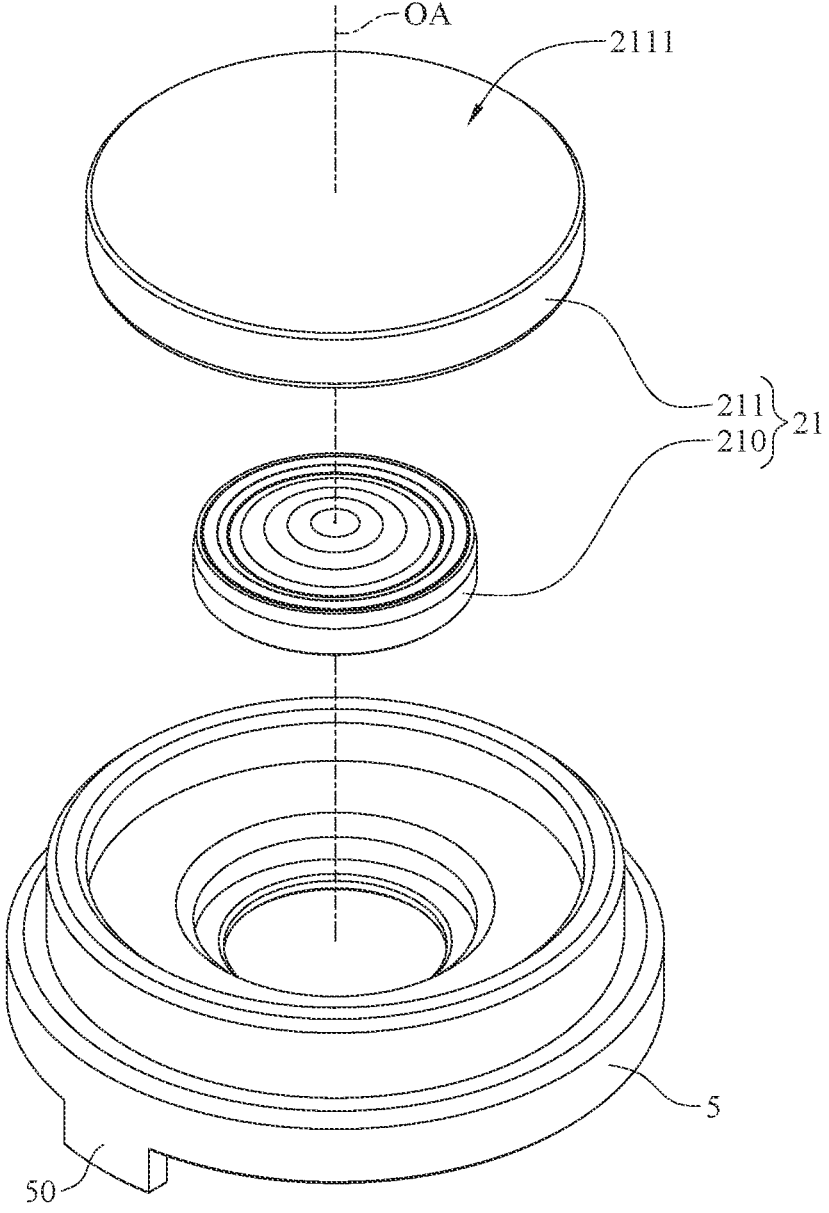
FIG. 4 is a partial and exploded view of the imaging lens module in FIG. 3.
Figure 5:
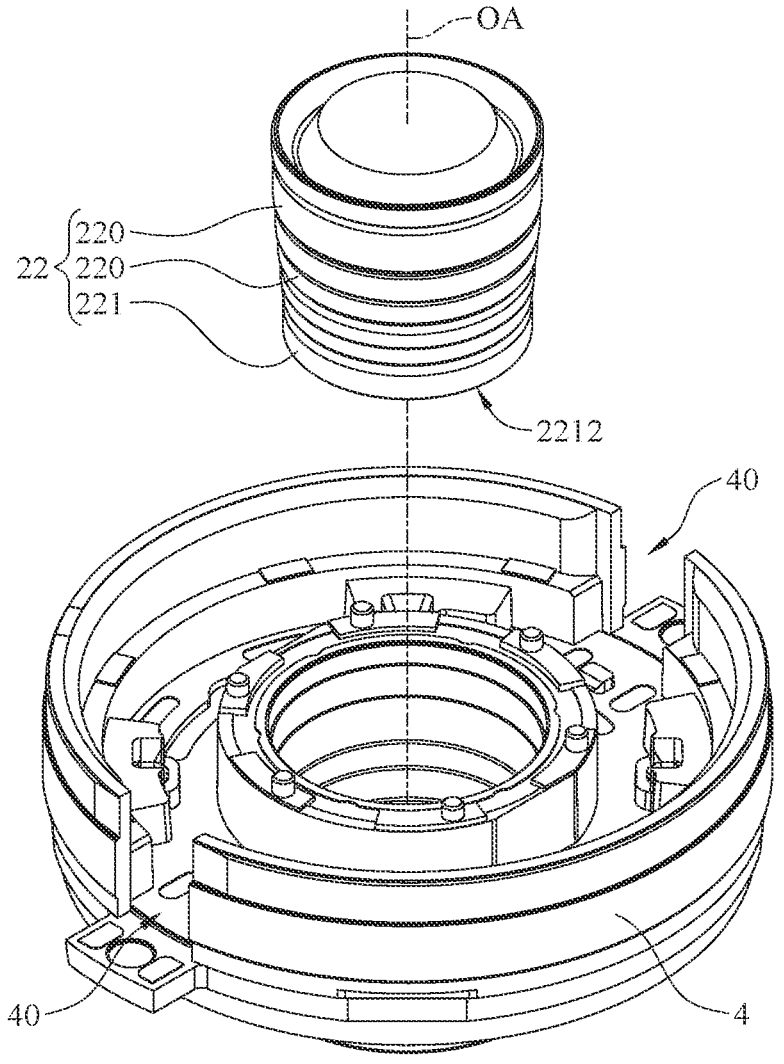
FIG. 5 is another partial and exploded view of the imaging lens module in FIG. 3.
Figure 6:
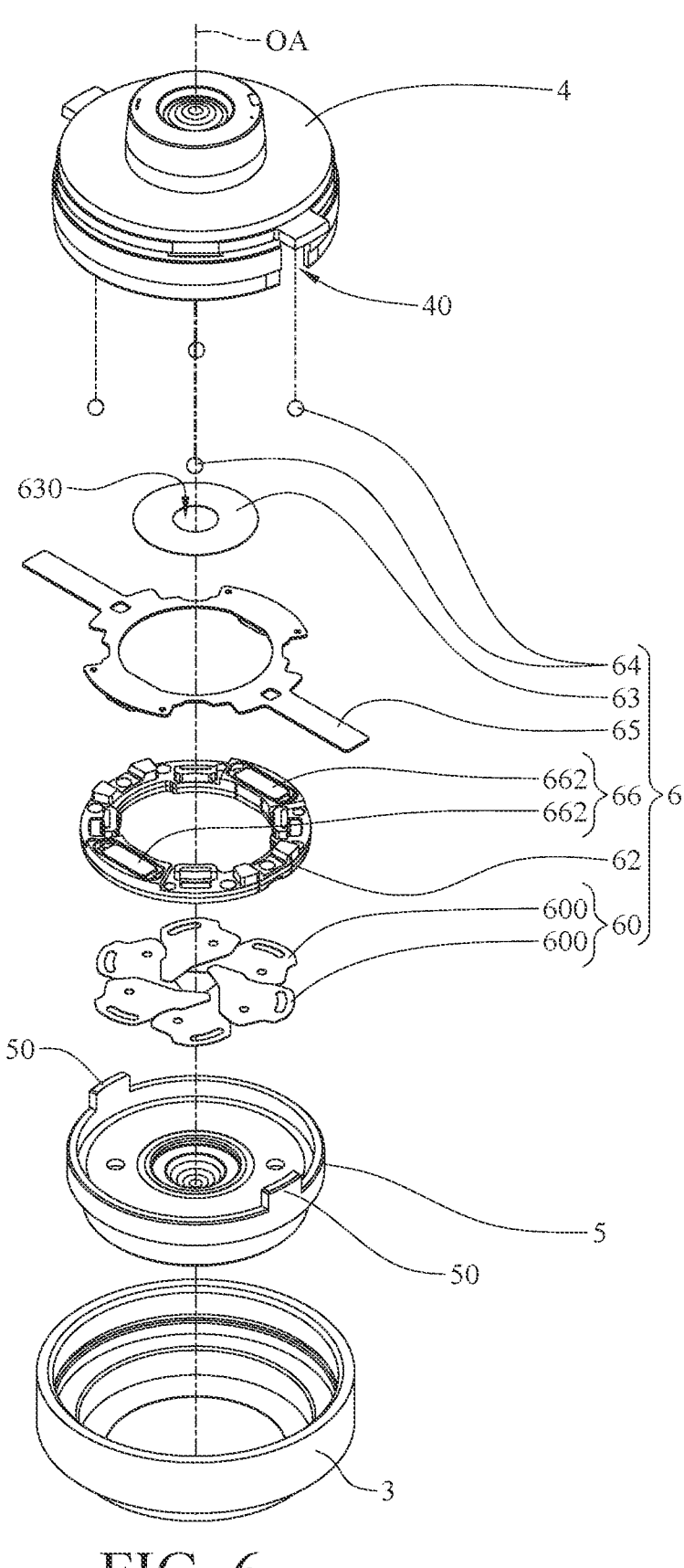
FIG. 6 is another exploded view of the imaging lens module in FIG. 1.
Figure 7:
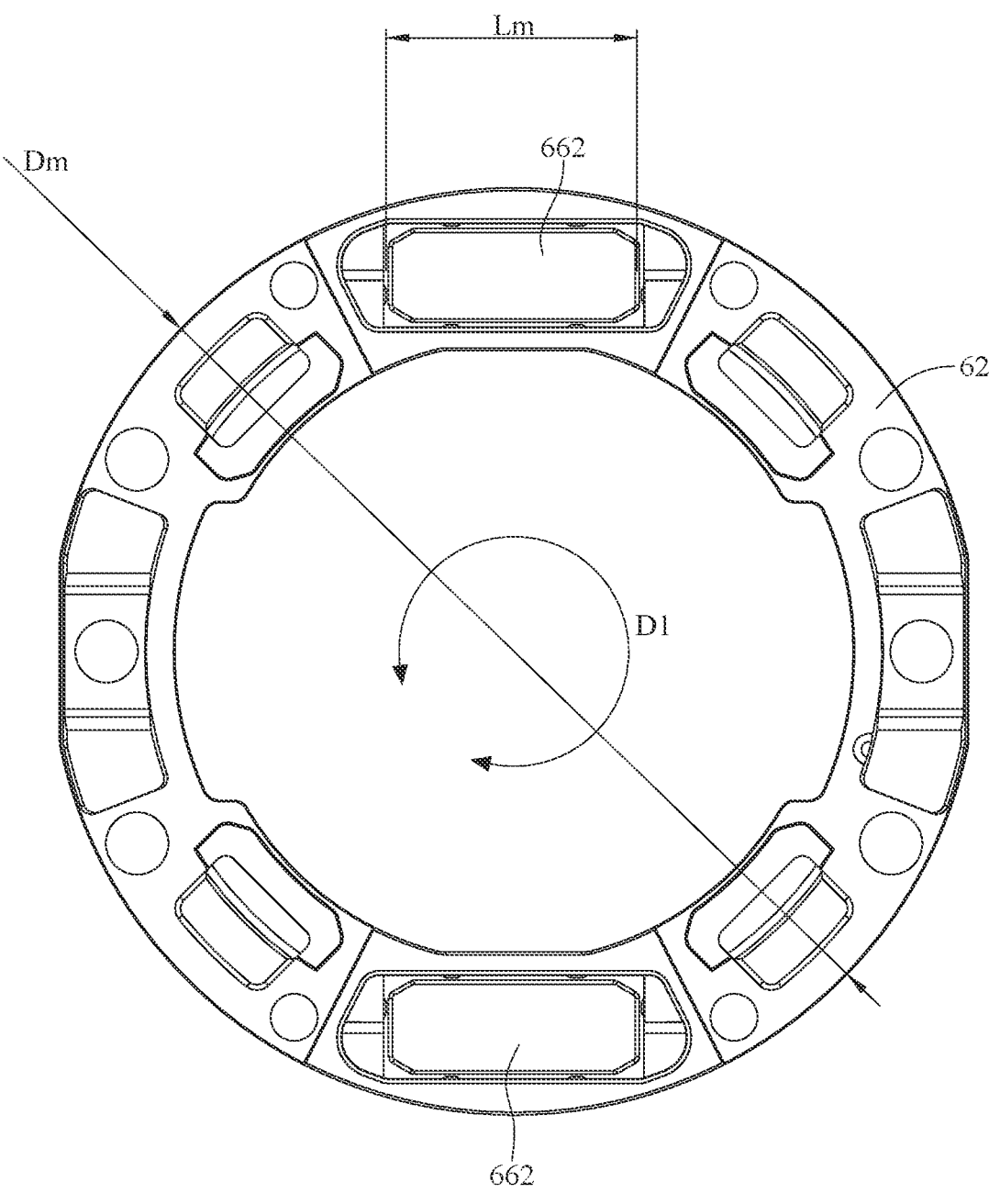
FIG. 7 is a bottom view of a movable component and magnets of the imaging lens module in FIG. 3.
Figure 8:
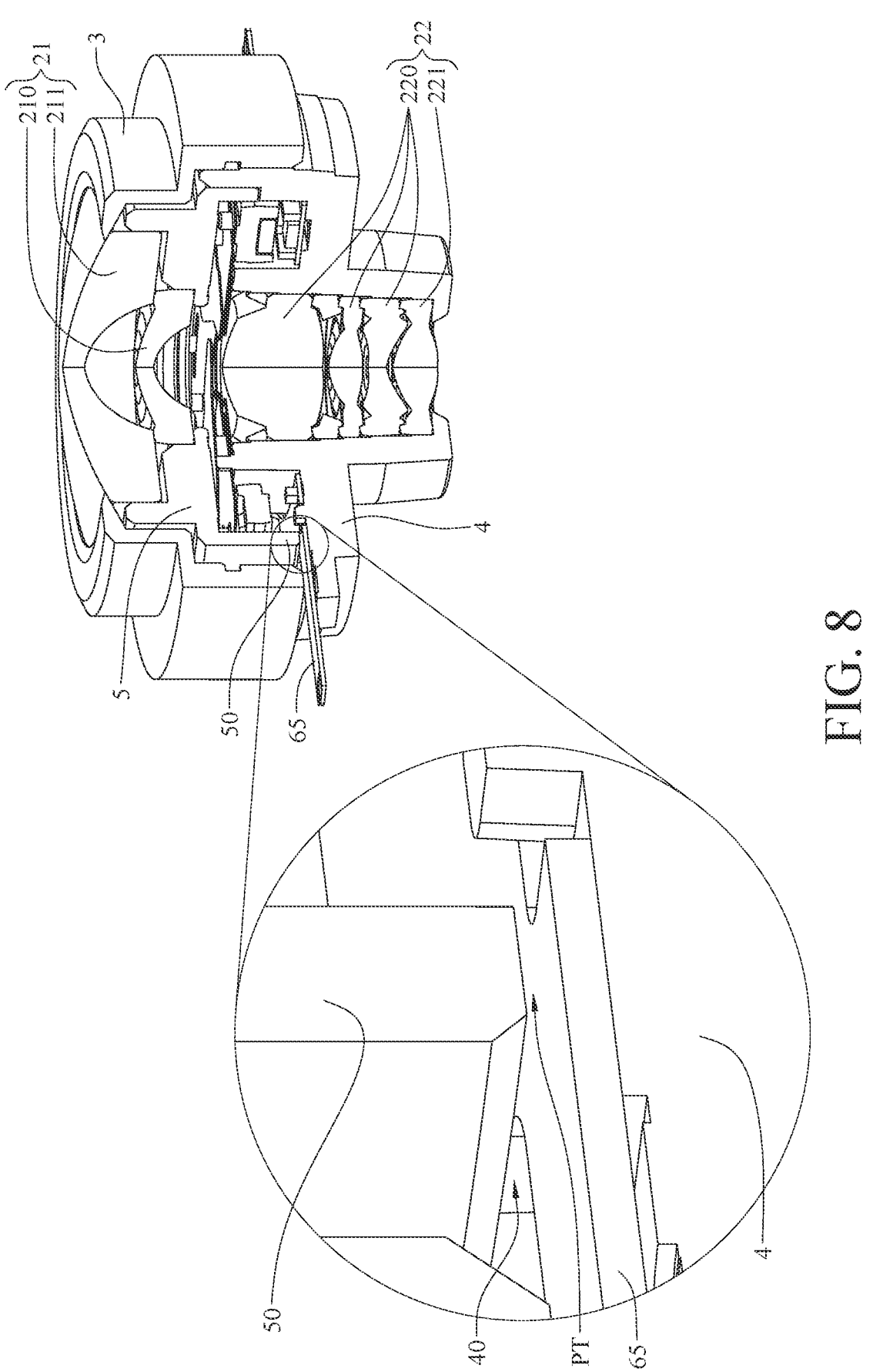
FIG. 8 is a sectional view with a partial enlarged view of the imaging lens module in FIG. 1.
Figure 9:
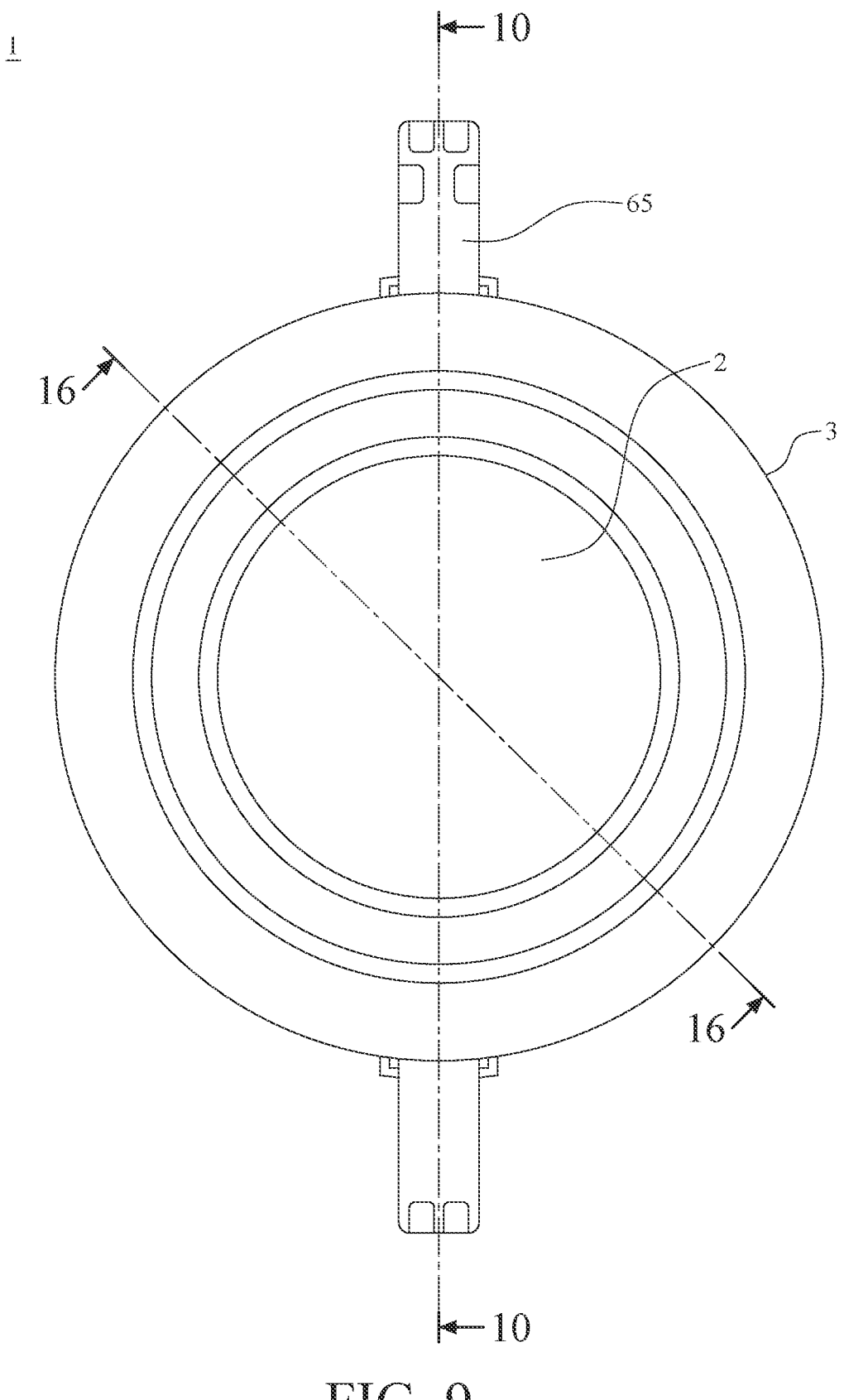
FIG. 9 is a top view of the imaging lens module in FIG. 1.
Figure 10:
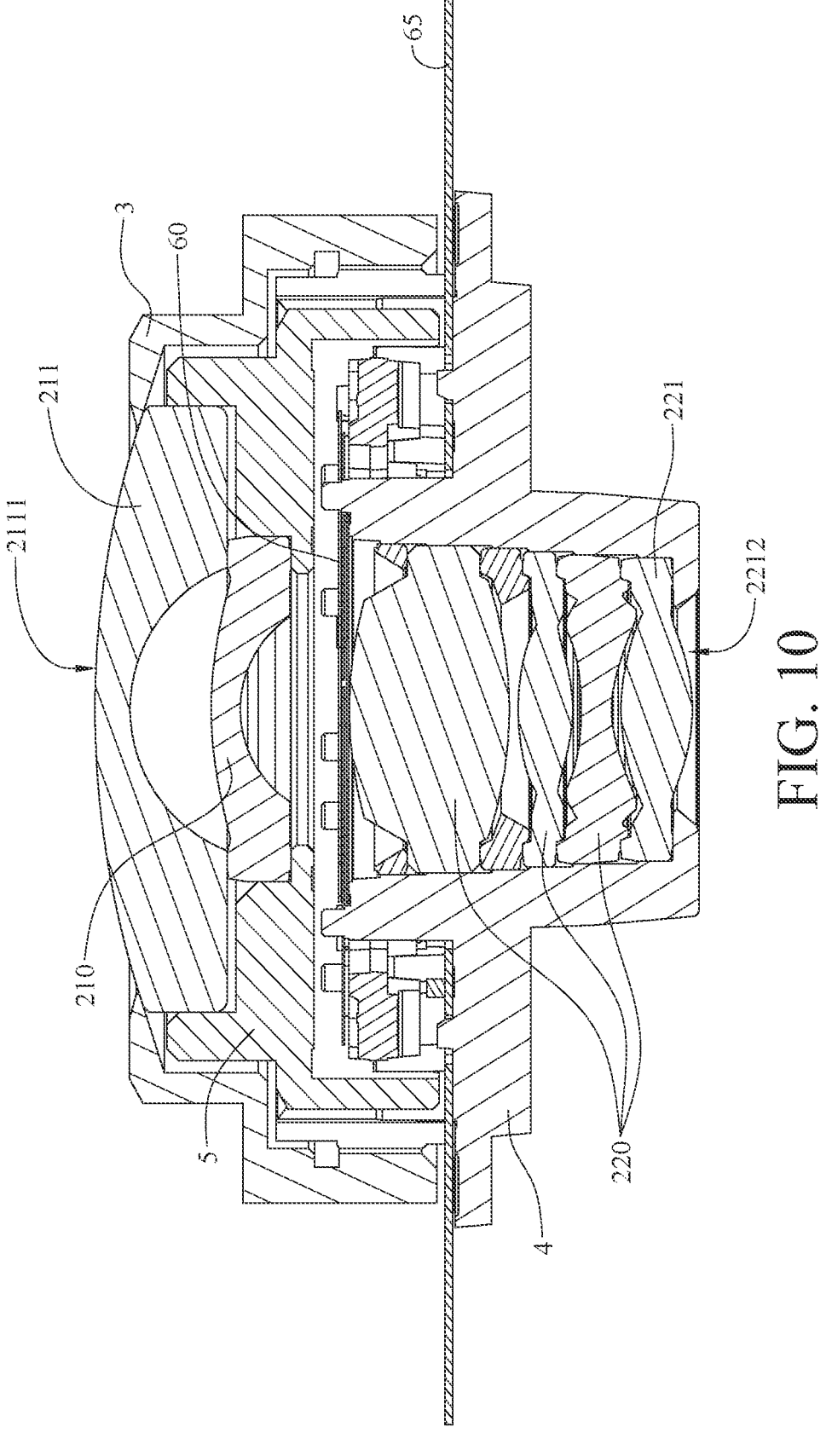
FIG. 10 is a cross-sectional view of the imaging lens module along line 10-10 in FIG. 9.
Figure 11:
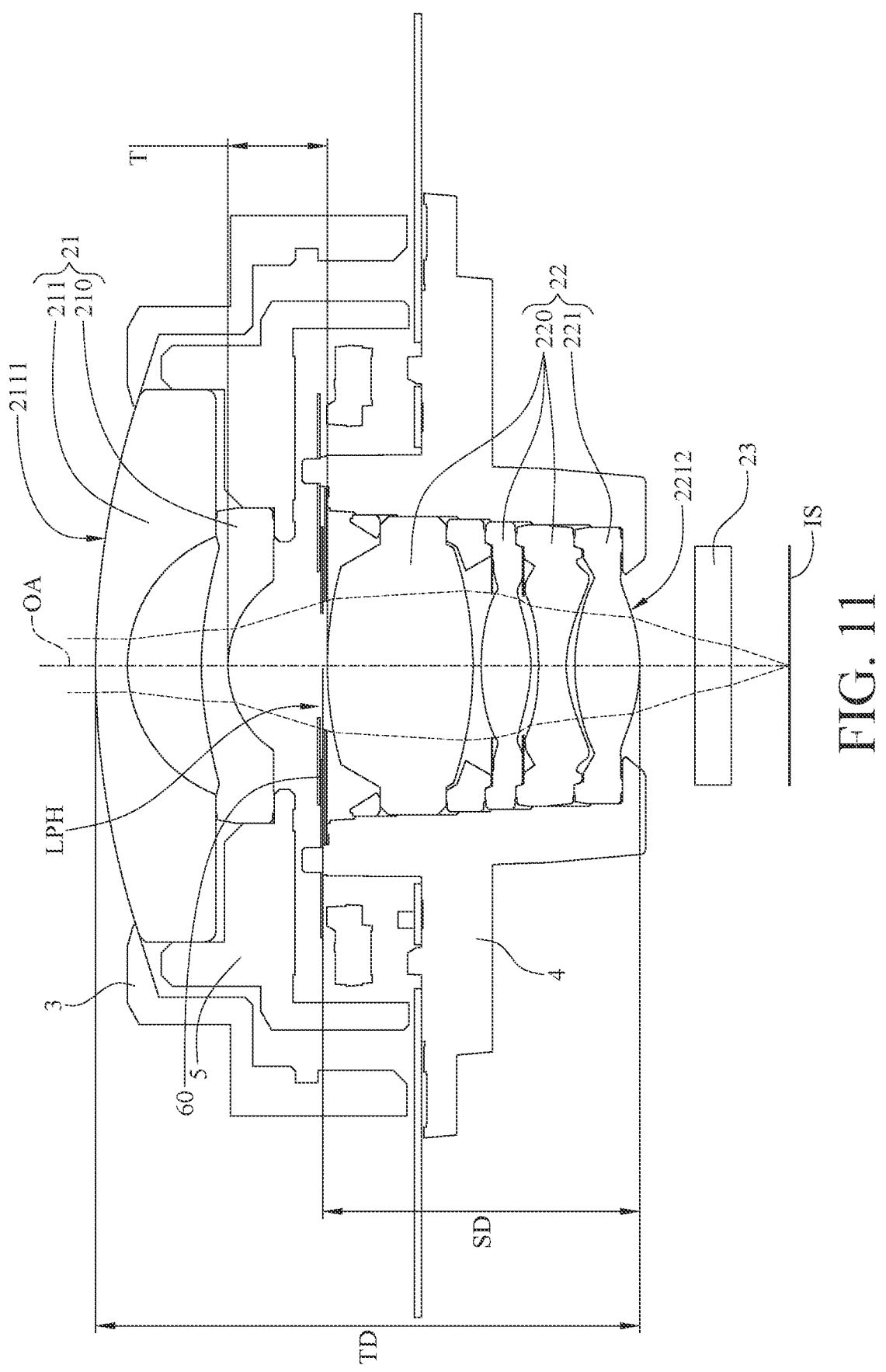
FIG. 11 is a cross-sectional view of the imaging lens module along line 10-10 in FIG. 9, along with a filter and an image sensor corresponding thereto.
Figure 12:
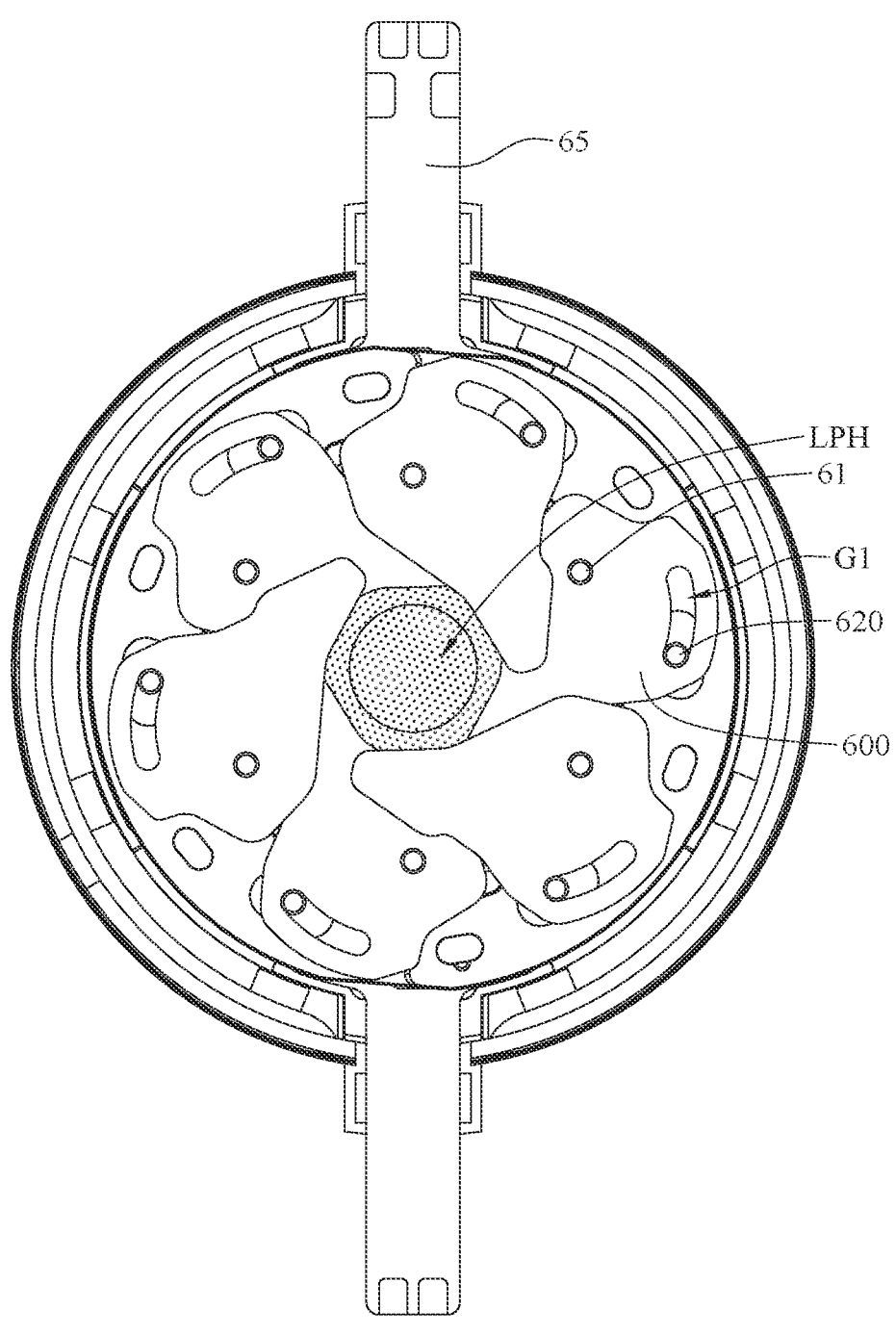
FIG. 12 is a top view of some components of the imaging lens module when an adjustable aperture module of the imaging lens module is in a maximum aperture state according to the 1st embodiment of the present disclosure.
Figure 13:
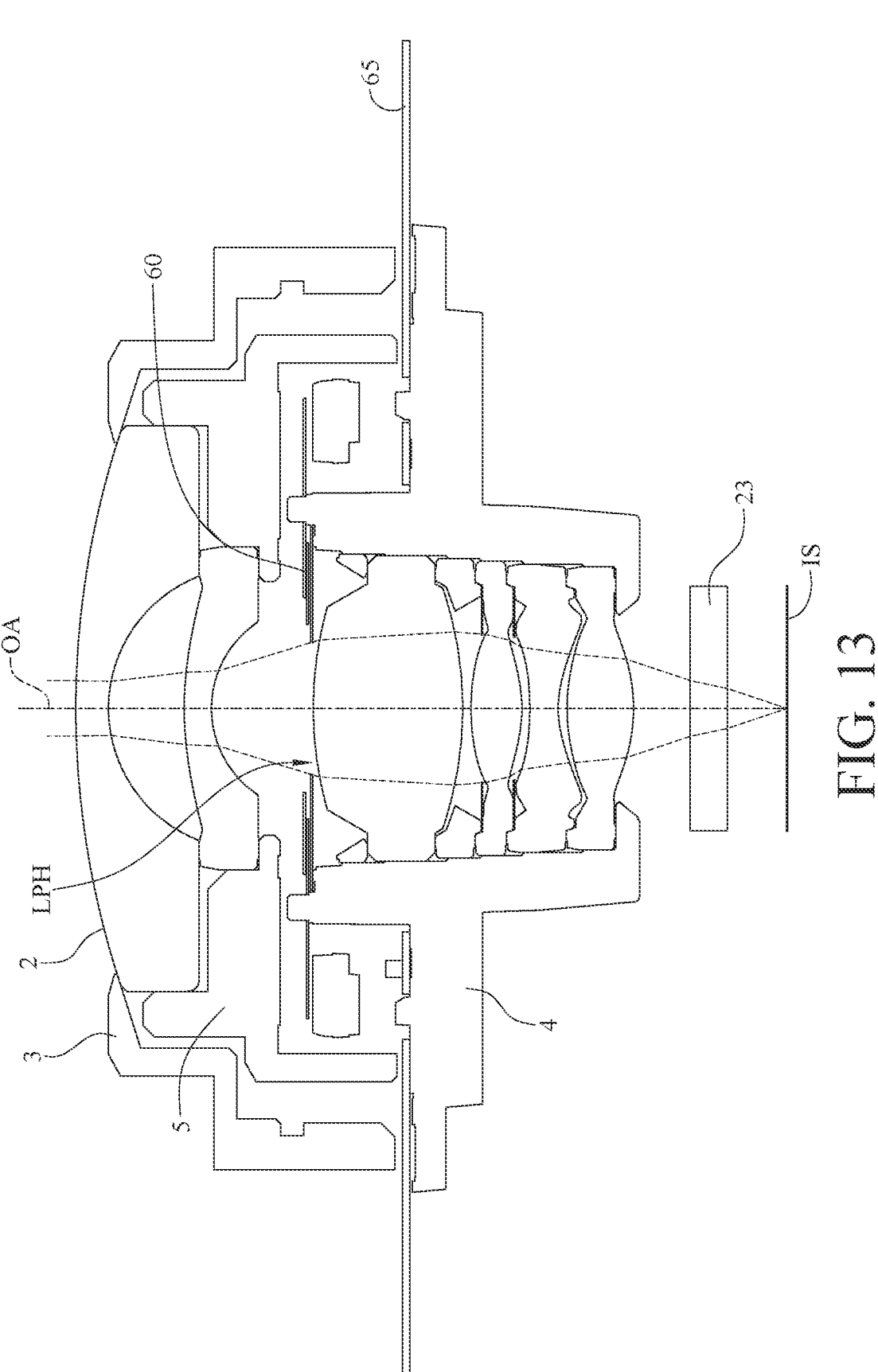
FIG. 13 is a schematic view of the imaging lens module, the filter and the image sensor in FIG. 11 when a light pass aperture is in a maximum size state.
Figure 14:
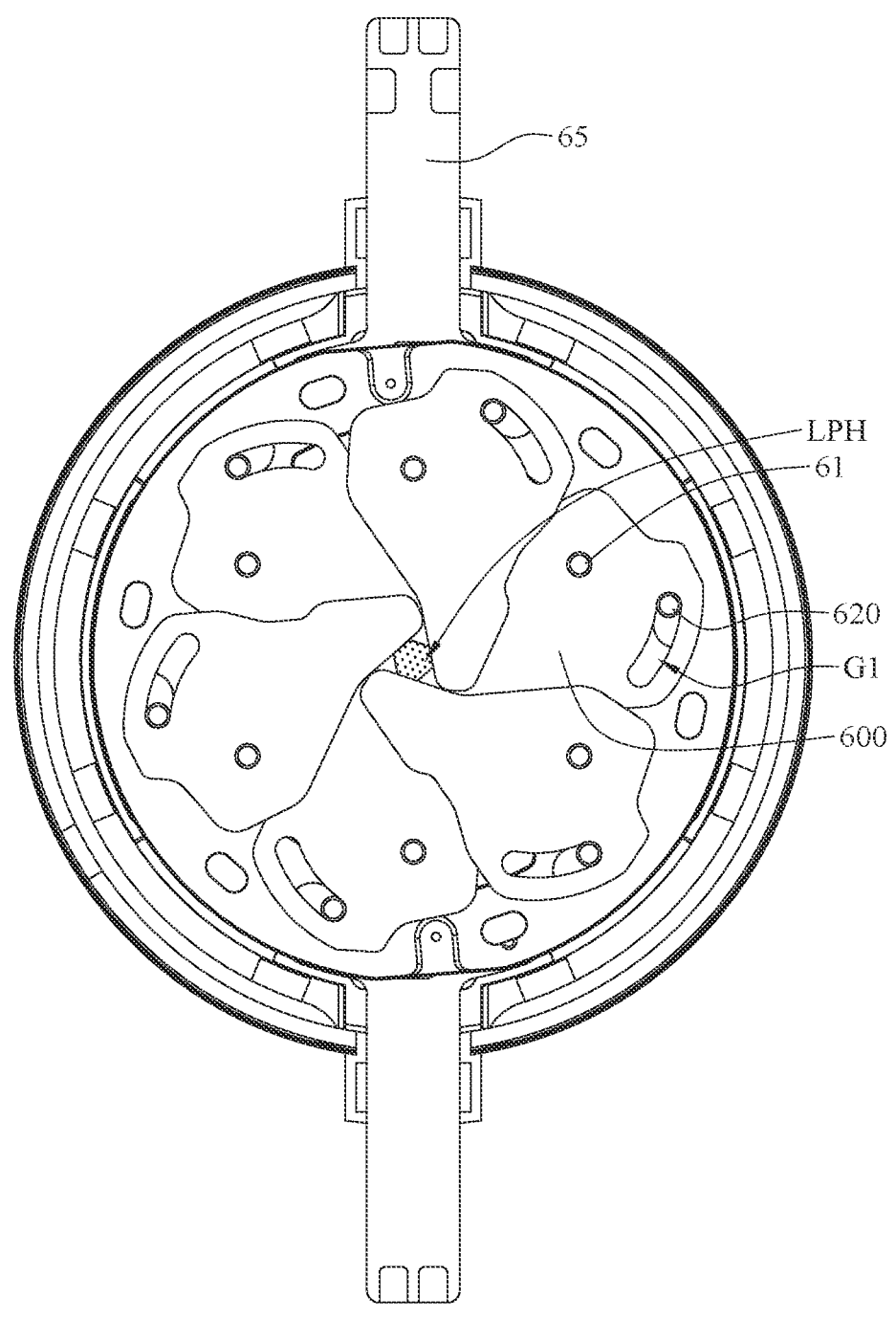
FIG. 14 is a top view of some components of the imaging lens module when the adjustable aperture module of the imaging lens module is in a minimum aperture state according to the 1st embodiment of the present disclosure.
Figure 15:
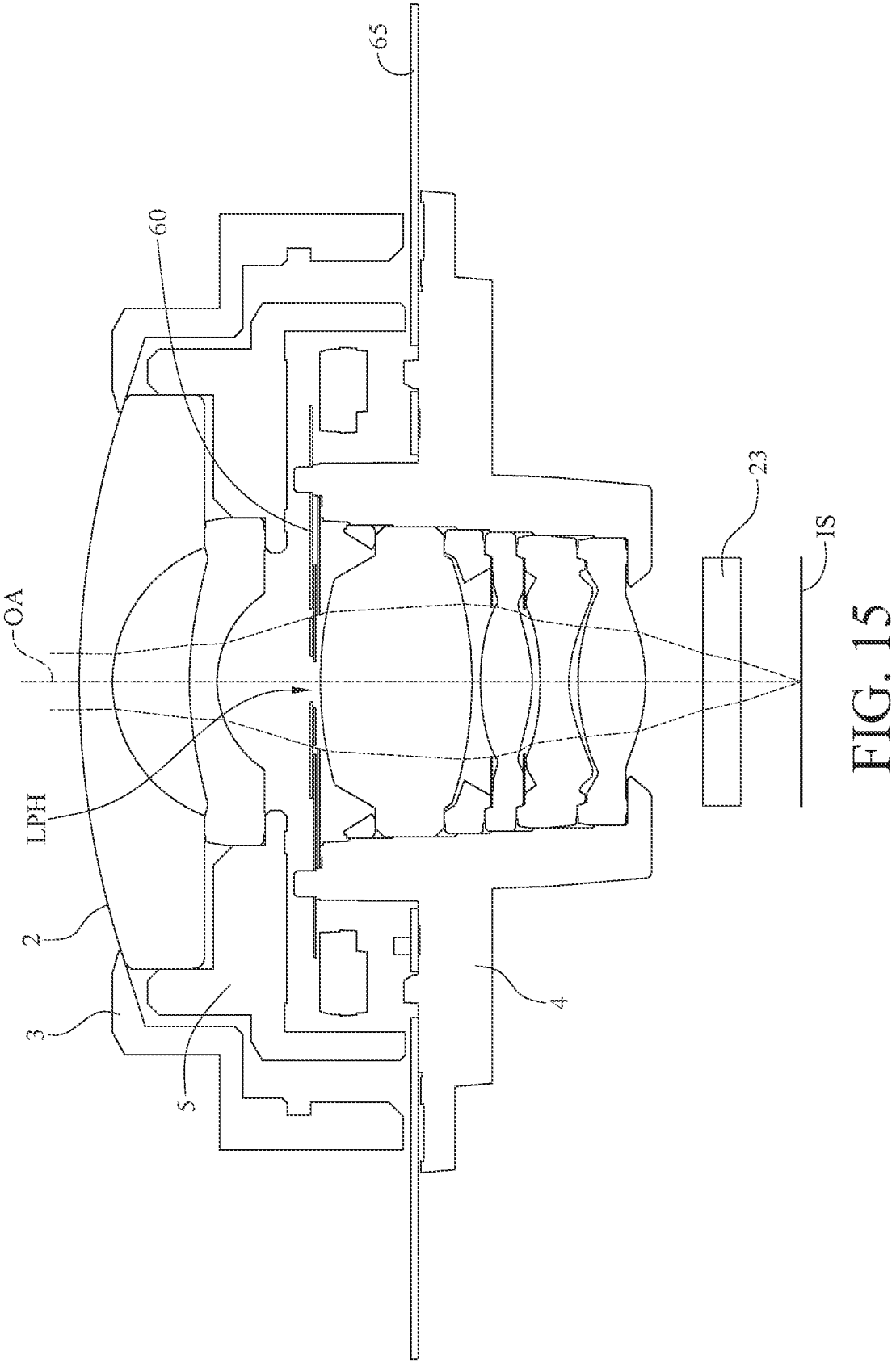
FIG. 15 is a schematic view of the imaging lens module, the filter and the image sensor in FIG. 11 when the light pass aperture is in a minimum size state.
Figure 16:
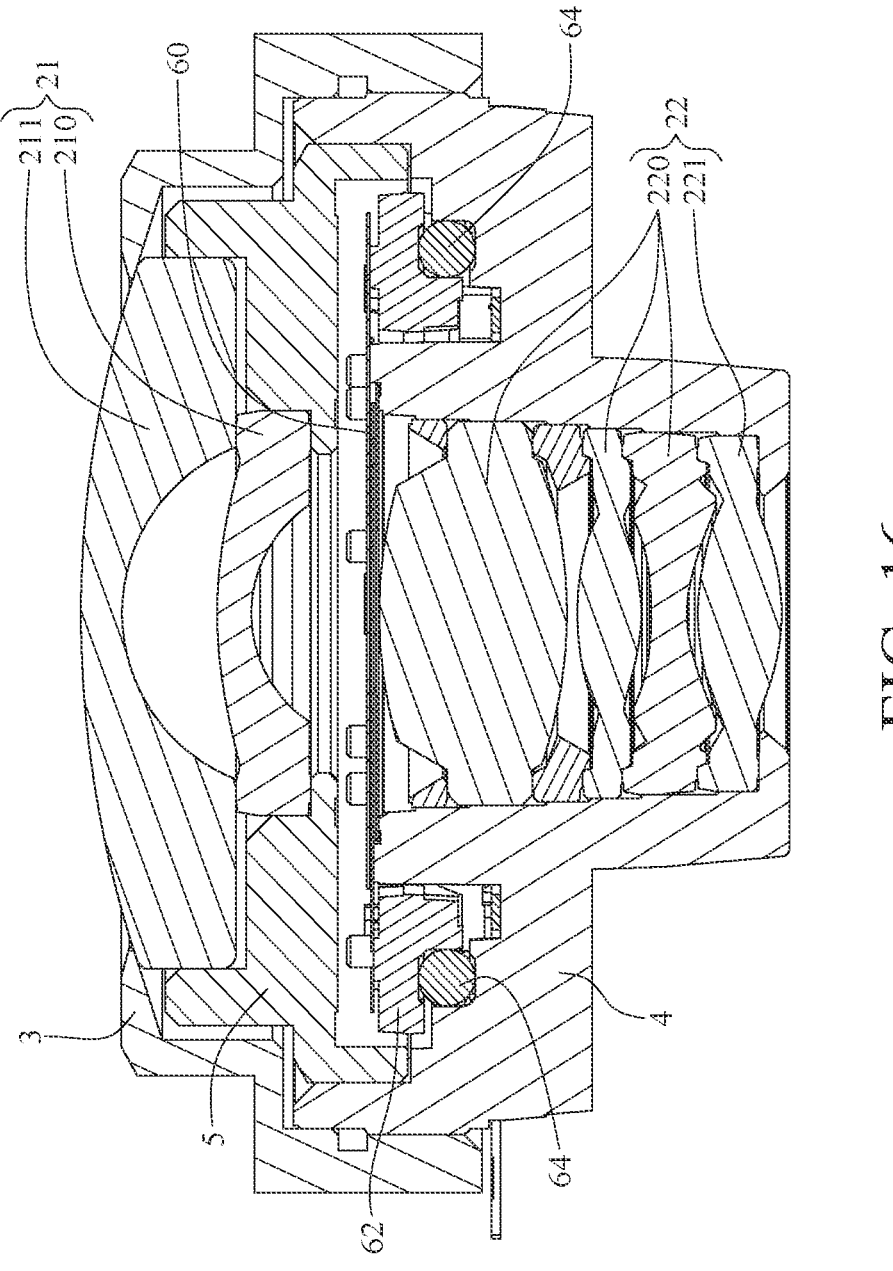
FIG. 16 is a cross-sectional view of the imaging lens module along line 16-16 in FIG. 9.
Figure 17:
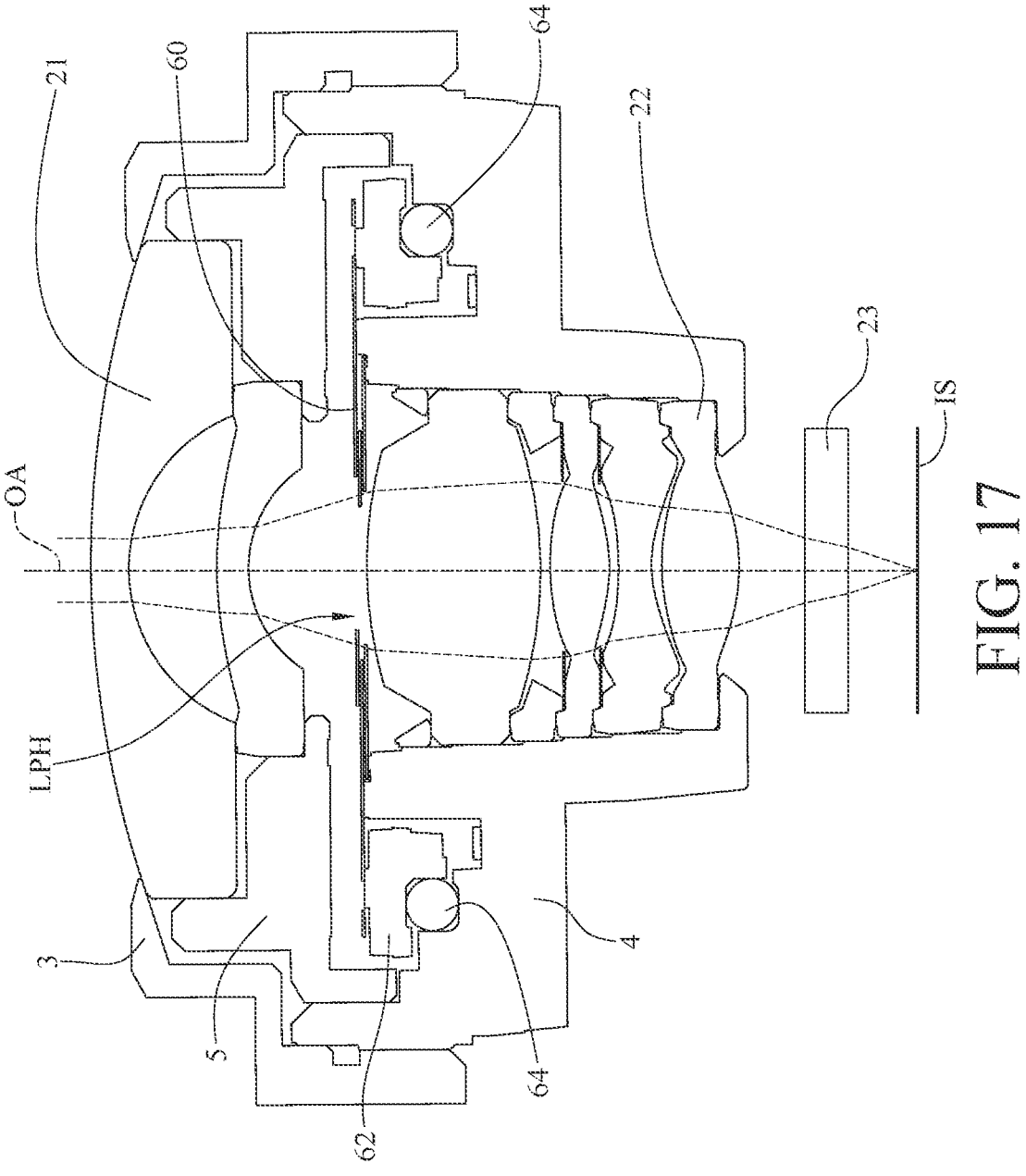
FIG. 17 is a cross-sectional view of the imaging lens module along line 16-16 in FIG. 9, along with the filter and the image sensor corresponding thereto.

FIG. 1 is a perspective view of an imaging lens module according to the 1st embodiment of the present disclosure, FIG. 2 is a partial exploded view of the imaging lens module in FIG. 1, FIG. 3 is a further exploded view of the imaging lens module in FIG. 2, FIG. 4 is a partial and exploded view of the imaging lens module in FIG. 3, FIG. 5 is another partial and exploded view of the imaging lens module in FIG. 3, FIG. 6 is another exploded view of the imaging lens module in FIG. 1, FIG. 7 is a bottom view of a movable component and magnets of the imaging lens module in FIG. 3, FIG. 8 is a sectional view with a partial enlarged view of the imaging lens module in FIG. 1, FIG. 9 is a top view of the imaging lens module in FIG. 1, FIG. 10 is a cross-sectional view of the imaging lens module along line 10-10 in FIG. 9, FIG. 11 is a cross-sectional view of the imaging lens module along line 10-10 in FIG. 9, along with a filter and an image sensor corresponding thereto, FIG. 12 is a top view of some components of the imaging lens module when an adjustable aperture module of the imaging lens module is in a maximum aperture state according to the 1st embodiment of the present disclosure, FIG. 13 is a schematic view of the imaging lens module, the filter and the image sensor in FIG. 11 when a light pass aperture is in a maximum size state, FIG. 14 is a top view of some components of the imaging lens module when the adjustable aperture module of the imaging lens module is in a minimum aperture state according to the 1st embodiment of the present disclosure, FIG. 15 is a schematic view of the imaging lens module, the filter and the image sensor in FIG. 11 when the light pass aperture is in a minimum size state, FIG. 16 is a cross-sectional view of the imaging lens module along line 16-16 in FIG. 9, and FIG. 17 is a cross-sectional view of the imaging lens module along line 16-16 in FIG. 9, along with the filter and the image sensor corresponding thereto.

The imaging lens module 1 includes an imaging lens 2, a retainer 3, a first spacer 4, a second spacer 5 and an adjustable aperture module 6.

The imaging lens 2 includes an object-side lens group 21, an image-side lens group 22 and a filter 23. The object-side lens group 21 is located on an object side of the image-side lens group 22, and the filter 23 is located between the image-side lens group 22 and an image sensor IS. In addition, an optical axis OA of the imaging lens 2 passes through the object-side lens group 21, the image-side lens group 22 and the filter 23, and the object-side lens group 21, the image-side lens group 22 and the filter 23 are arranged along the optical axis OA in order from an object side to an image side. As shown in FIG. 4 and FIG. 5, the object-side lens group 21 includes a plurality of lens elements 210 and 211, and the image-side lens group 22 includes a plurality of lens elements 220 and 221. Moreover, the filter 23 is, for example, a blue glass.

The retainer 3 is disposed on an object side of the imaging lens 2, and the retainer 3 is in physical contact with a most object-side lens element 211 in the object-side lens group 21.

The first spacer 4 is disposed corresponding to the second spacer 5, and the first spacer 4 and the second spacer 5 are coupled to each other and together form an inner space in which the adjustable aperture module 6 is accommodated. Moreover, the first spacer 4 receives the image-side lens group 22 and is in physical contact with the image-side lens group 22, and the second spacer 5 receives the object-side lens group 21 and is in physical contact with the object-side lens group 21.

The adjustable aperture module 6 is disposed between the object-side lens group 21 and the image-side lens group 22, and the adjustable aperture module 6 is disposed in the inner space formed by the first spacer 4 and the second spacer 5. Moreover, the first spacer 4 is located at an image side of the adjustable aperture module 6, the second spacer 5 is located at an object side of the adjustable aperture module 6, and the optical axis OA passes through a center of the first spacer 4 and a center of the second spacer 5.

The adjustable aperture module 6 includes a blade assembly 60, six fixed shafts 61, a movable component 62, a fixed aperture element 63, four rollable elements 64, a printed circuit board 65 and a driving mechanism 66.

The blade assembly 60 includes six light-blocking blades 600 overlapping one another, and the light-blocking blades 600 are arranged in a circumferential direction D1 surrounding the optical axis OA and together form a light pass aperture LPH whose aperture size is adjustable. The optical axis OA passes through the light pass aperture LPH.

The fixed shafts 61 are disposed on the first spacer 4 and disposed corresponding to the blade assembly 60. Specifically, the light-blocking blades 600 of the blade assembly 60 are rotatably disposed on the fixed shafts 61, respectively, such that the light-blocking blades 600 of the blade assembly 60 are pivotable relative to the fixed shafts 61, respectively.

The movable component 62 is disposed corresponding to the blade assembly 60. Specifically, the movable component 62 has six connection protrusions 620 slidably disposed in six grooves G1 of the light-blocking blades 600, respectively, so that when the driving mechanism 66 drives the movable component 62 to rotate in the circumferential direction D1, the movable component 62 drives the light-blocking blades 600 of the blade assembly 60 to pivot relative to the fixed shafts 61 for varying the aperture size of the light pass aperture LPH.

The fixed aperture element 63 is disposed between the object-side lens group 21 and the image-side lens group 22, and the fixed aperture element 63 and the blade assembly 60 are disposed adjacent to each other. Furthermore, the fixed aperture element 63 includes a central opening 630, and the optical axis OA passes through the central opening 630. Moreover, there is no additional optical lens element disposed between the central opening 630 of the fixed aperture element 63 and the light pass aperture LPH formed by the blade assembly 60.

The rollable elements 64 are disposed between the first spacer 4 and the movable component 62, and when the driving mechanism 66 drives the movable component 62 to rotate in the circumferential direction D1, the rollable elements 64 provides the movable component 62 with a rotational degree of freedom relative to the first spacer 4.

The printed circuit board 65 is attached to the first spacer 4, the printed circuit board 65 is disposed corresponding to the driving mechanism 66 and electrically connected to the driving mechanism 66, and the driving mechanism 66 is configured to rotate the movable component 62 in the circumferential direction D1. Specifically, the driving mechanism 66 includes two coils 661 and two magnets 662, the coils 661 are disposed on the printed circuit board 65, and the magnets 662 are disposed on the movable component 62. The driving mechanism 66 uses a magnetic driving force generated by the interaction between the coils 661 and the magnets 662 to move the blade assembly 60 relative to the fixed shafts 61 for varying the aperture size of the light pass aperture LPH. As shown in FIG. 12 and FIG. 13, when the adjustable aperture module 6 is in a maximum aperture state, the light pass aperture LPH is at a maximum size. As shown in FIG. 14 and FIG. 15, when the adjustable aperture module 6 is in a minimum aperture state, the light pass aperture LPH is at a minimum size. In FIG. 12 and FIG. 14, only select components of the imaging lens module 1 are depicted, and certain components located on the object side of the adjustable aperture module 6 have been omitted to enhance the clarity of the state of the light pass aperture LPH.

As shown in FIG. 6 and FIG. 7, in this embodiment, the rollable elements 64 and the magnets 662 are arranged along the circumferential direction D1, and two sides of each of the magnets 662, in both a clockwise direction and a counterclockwise direction, are adjacent to the rollable elements 64.

As shown in FIG. 3 to FIG. 6 and FIG. 8, the first spacer 4 includes two notch structures 40, the second spacer 5 includes two protruding structures 50, and the protruding structures 50 are disposed opposite to the notch structures 40, respectively. Moreover, a passage PT is formed between the notch structure 40 and the protruding structure 50 corresponding to each other for the printed circuit board 65 to pass therethrough.

As shown in FIG. 12 and FIG. 14, when the adjustable aperture module 6 is in the maximum aperture state, an area of the light pass aperture LPH at the maximum size is A1; when the adjustable aperture module 6 is in the minimum aperture state, an area of the light pass aperture LPH at the minimum size is A2; when a difference in area between the maximum size of the light pass aperture LPH and the minimum size thereof is ΔA; the following conditions are satisfied: A1=7.50 mm$^2$; A2=0.39 mm$^2$; and ΔA=A1−A2=7.11 mm$^2$.

As shown in FIG. 11 and also referring to FIG. 12 and FIG. 14, when an axial distance between the object-side lens group 21 and the image-side lens group 22 is T, and the difference in area between the maximum size of the light pass aperture LPH and the minimum size thereof is ΔA, the following conditions are satisfied: T=1.79 mm; √ΔA=2.67 mm; and T/√ΔA=0.67.

When a maximum field of view of the imaging lens module 1 is FOV, the following condition is satisfied: 85 degrees<FOV<210 degrees.

As shown in FIG. 7, when a length of each magnet 662 in the circumferential direction D1 is Lm, and a maximum outer diameter of the movable component 62 is Dm, the following conditions are satisfied: Lm=3.2 mm; Dm=11.84 mm; and Lm/Dm=0.27.

As shown in FIG. 11, when a distance between the light pass aperture LPH and an image-side surface 2212 of a most image-side lens element 221 in the image-side lens group 22 in a direction parallel to the optical axis OA is SD, and a distance between an object-side surface 2111 of the most object-side lens element 211 in the object-side lens group 21 and the image-side surface 2212 of the most image-side lens element 221 in the image-side lens group 22 in the direction parallel to the optical axis OA is TD, the following conditions are satisfied: SD=5.73 mm; TD=9.84 mm; and SD/TD=0.58.

It should be noted that the present disclosure is not limited to the number of the fixed shafts 61, the rollable elements 64 and the light-blocking blades 600 as described above. In other configurations, the number of fixed shafts can be more or less than six and correspond to the number of light-blocking blades, and the number of rollable element can be more or less than four.

Figure 18:
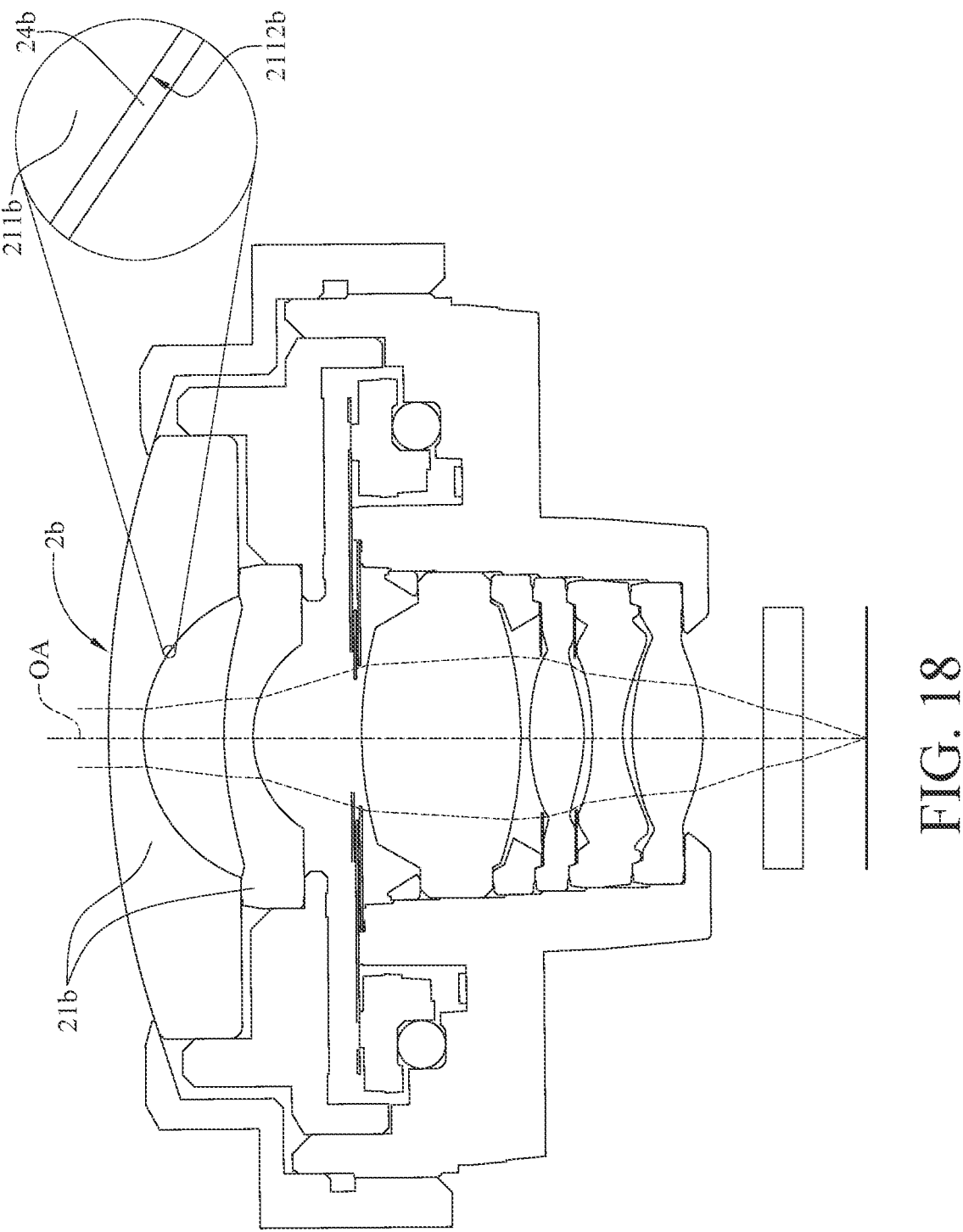
FIG. 18 is a cross-sectional view with a partial enlarged view of an imaging lens module along with a filter and an image sensor corresponding thereto according to another configuration of the present disclosure.

The present disclosure is not limited to the arrangement of the imaging lens module 1. For example, please refer to FIG. 18, which is a cross-sectional view with a partial enlarged view of an imaging lens module along with a filter and an image sensor corresponding thereto according to another configuration of the present disclosure. In another configuration of the present disclosure, an imaging lens module 1b is similar to the imaging lens module 1 as described above. The same reference numerals indicate the same components, and functions and effects provided by those components are the same as described above, so an explanation in this regard will not be provided again. The imaging lens 2b of the imaging lens module 1b further includes an IR-cut coating 24b disposed on an image-side surface 2112b of a most object-side lens element 211b of an object-side lens group 21b.

Figure 19:
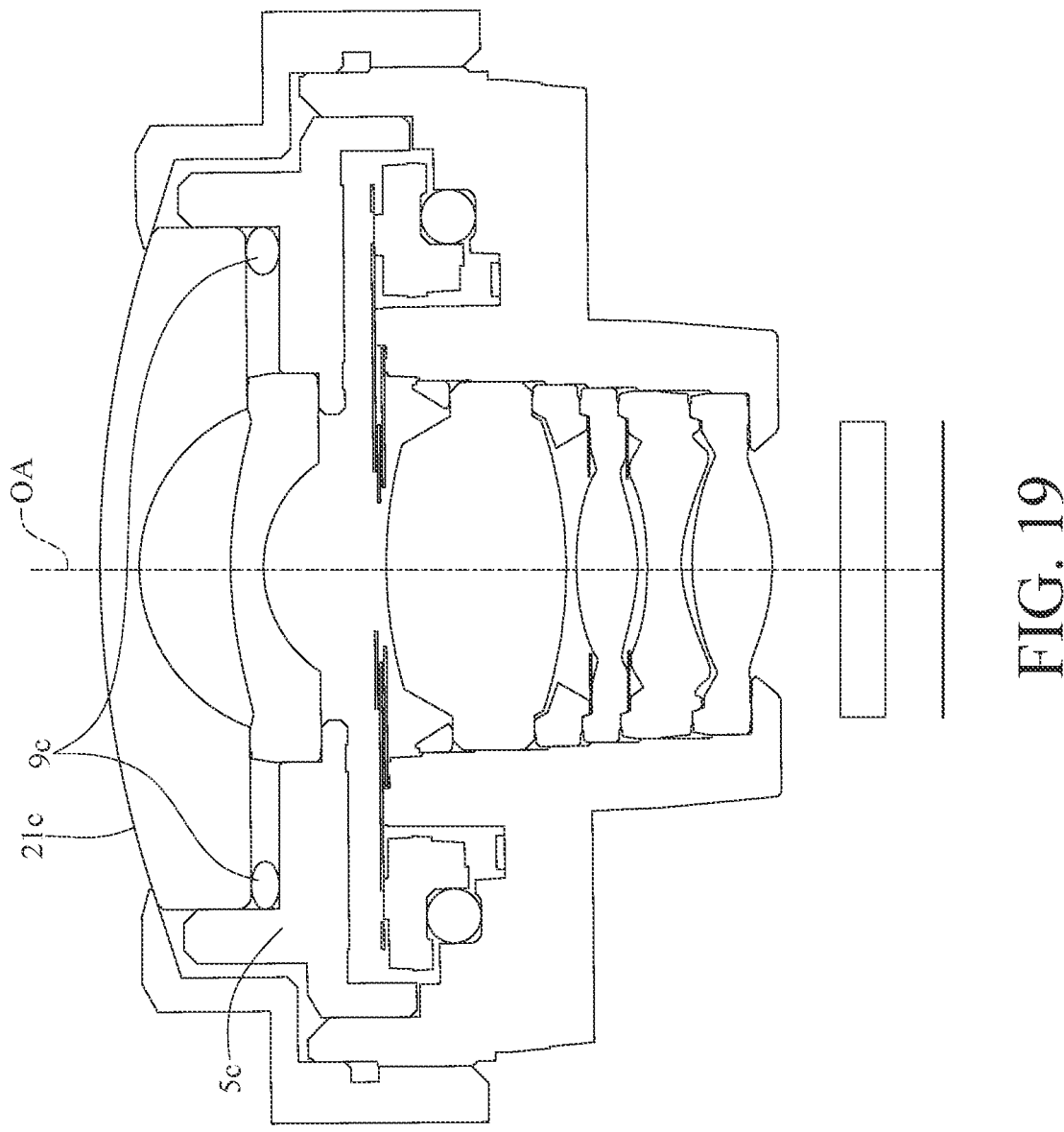
FIG. 19 is a cross-sectional view of an imaging lens module along with a filter and an image sensor corresponding thereto according to another configuration of the present disclosure.

As another example, please refer to FIG. 19, which is a cross-sectional view of an imaging lens module along with a filter and an image sensor corresponding thereto according to another configuration of the present disclosure. In another configuration of the present disclosure, an imaging lens module 1c is similar to the imaging lens module 1 as described above. The same reference numerals indicate the same components, and functions and effects provided by those components are the same as described above, so an explanation in this regard will not be provided again. The imaging lens module 1c further includes an O-ring 9c disposed between an object-side lens group 21c and a second spacer 5c.

2nd Embodiment

Figure 20:
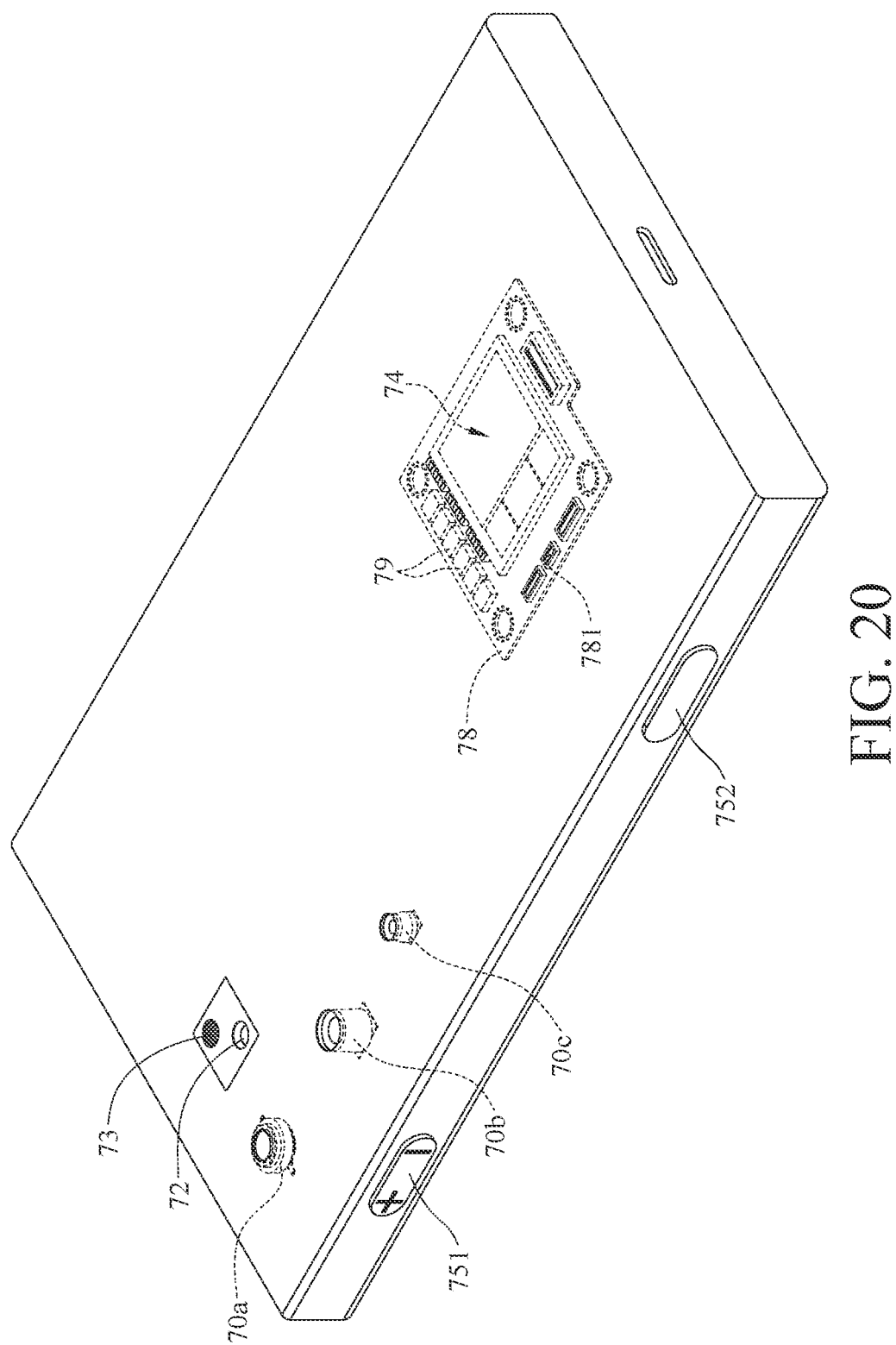
FIG. 20 is one perspective view of an electronic device according to the 2nd embodiment of the present disclosure.
Figure 21:
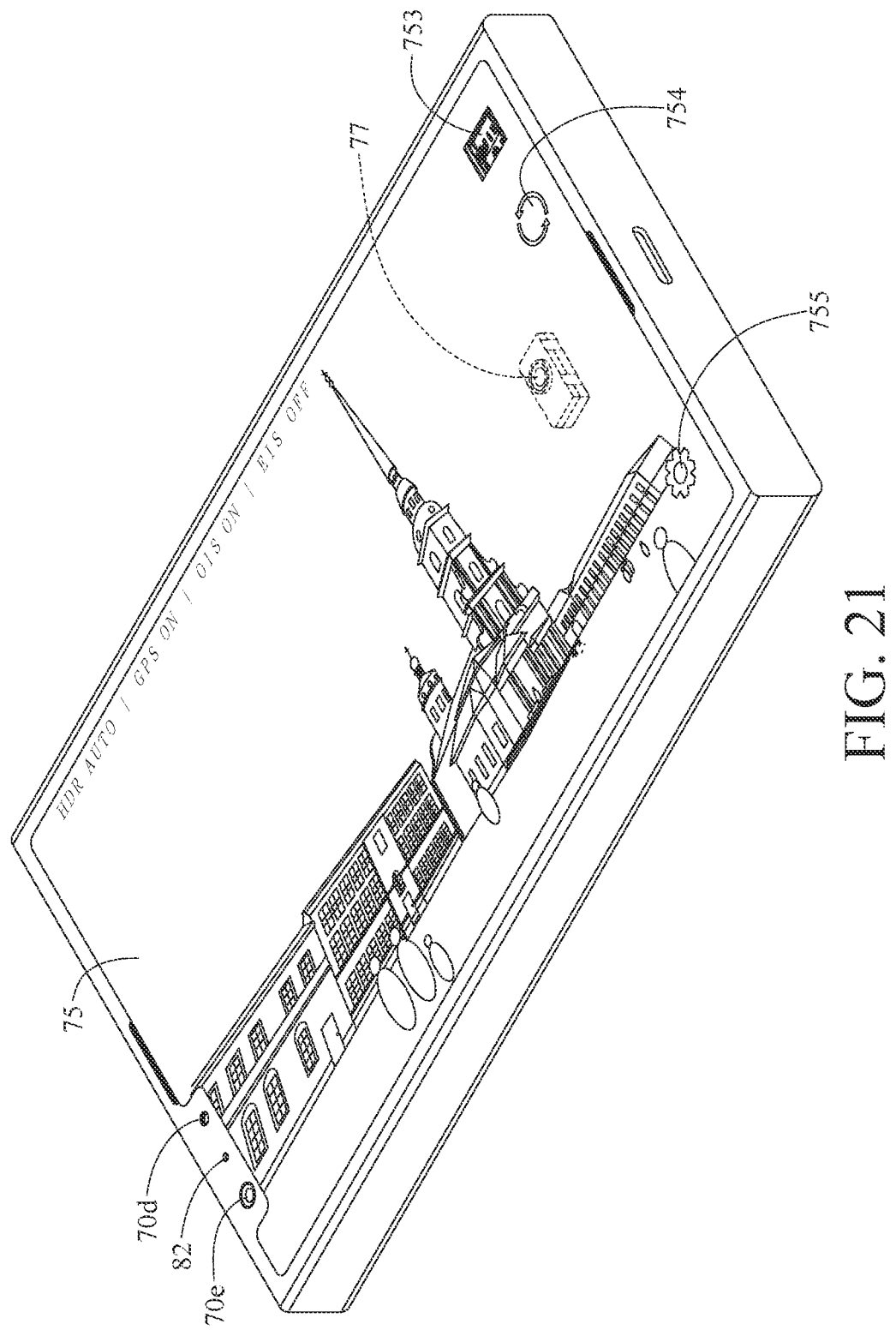
FIG. 21 is another perspective view of the electronic device in FIG. 20.
Figure 22:
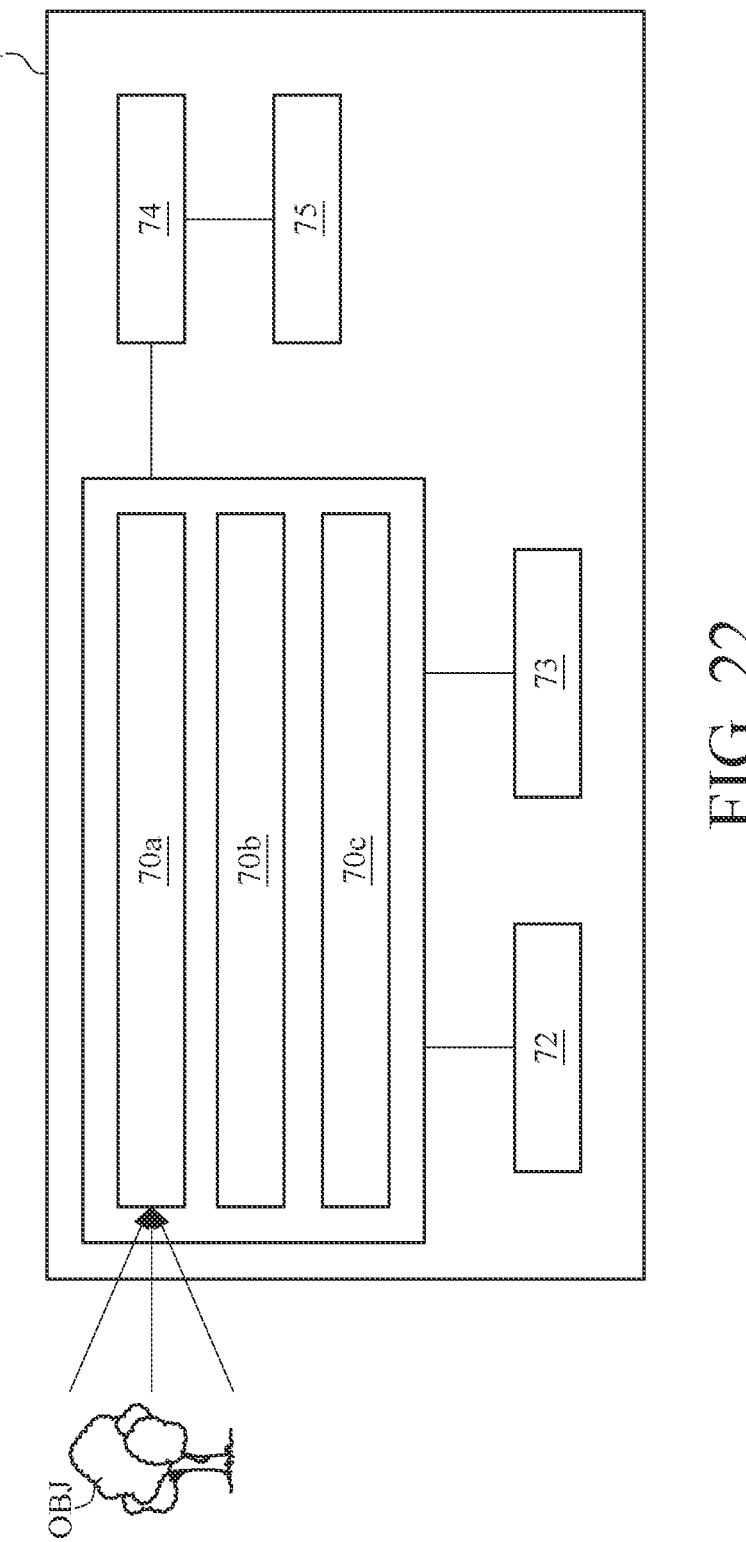
FIG. 22 is a block diagram of the electronic device in FIG. 20.

FIG. 20 is one perspective view of an electronic device according to the 2nd embodiment of the present disclosure, FIG. 21 is another perspective view of the electronic device in FIG. 20, and FIG. 22 is a block diagram of the electronic device in FIG. 20.

In this embodiment, an electronic device 7 is a mobile device such as a computer, a smartphone, a smart wearable device, a camera drone, a driving recorder and displayer, and the present disclosure is not limited thereto. The electronic device 7 includes a camera module 70a, a camera module 70b, a camera module 70c, a camera module 70d, a camera module 70e, a flash module 72, a focus assist module 73, an image signal processor, a display module 75, an image software processor and a biometric identification device 77. In addition, the camera module 70a includes the imaging lens module 1 as disclosed in the 1st embodiment and an image sensor disposed on an image surface of the imaging lens module 1. The camera module 70b is a wide-angle camera module, the camera module 70c is a macro-photo camera module, and the camera module 70e is a ToF (time of flight) camera module. In other configurations, the camera module 70a can include, for example, an imaging lens module of other configurations of the present disclosure, and the present disclosure is not limited thereto. Moreover, each of the camera module 70b, the camera module 70c, the camera module 70d and the camera module 70e can include, for example, an imaging lens module of other configurations of the present disclosure.

The camera module 70a, the camera module 70b and the camera module 70c are disposed on the same side of the electronic device 7. The camera module 70d, the camera module 70e and the display module 75 are disposed on the opposite side of the electronic device 7. The display module 75 can be a user interface, such that the camera module 70d and the camera module 70e can be front-facing cameras of the electronic device 7 for taking selfies, but the present disclosure is not limited thereto.

Figure 23:
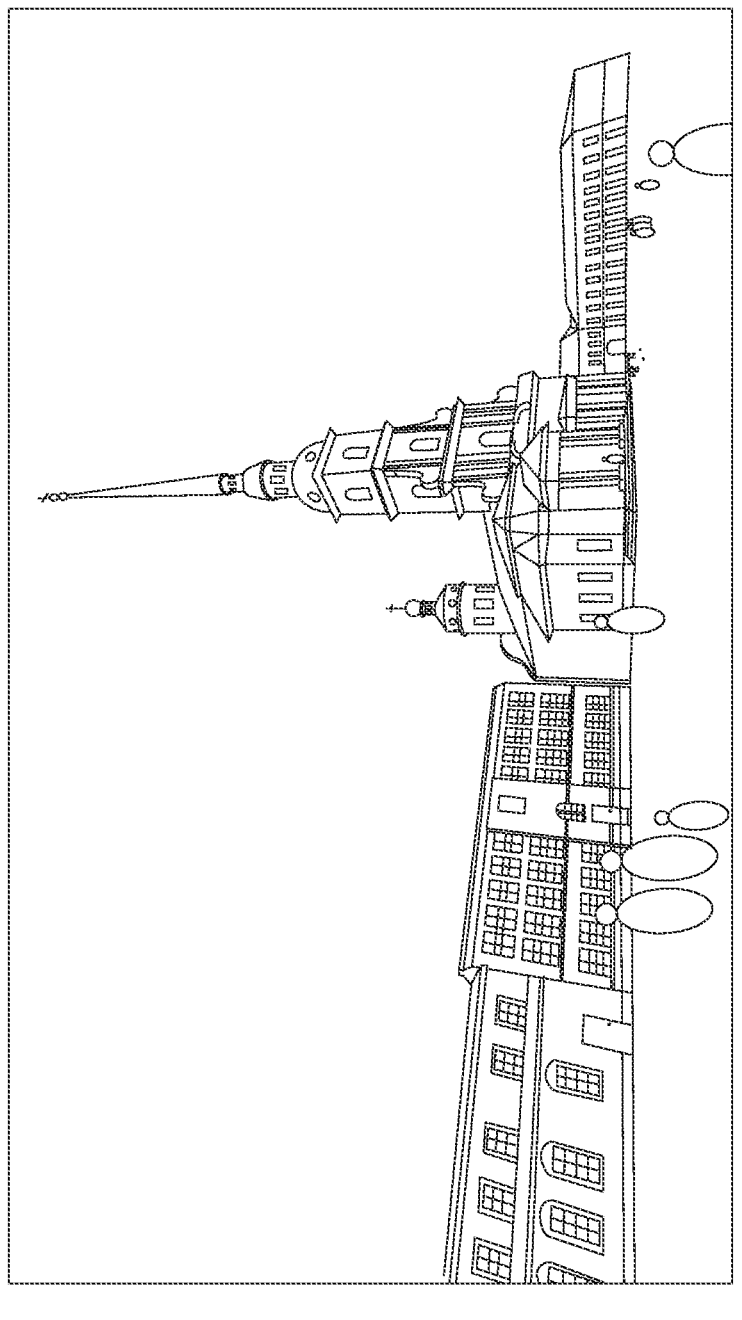
FIG. 23 shows an image captured by the electronic device using a wide-angle camera module in FIG. 20.
Figure 24:
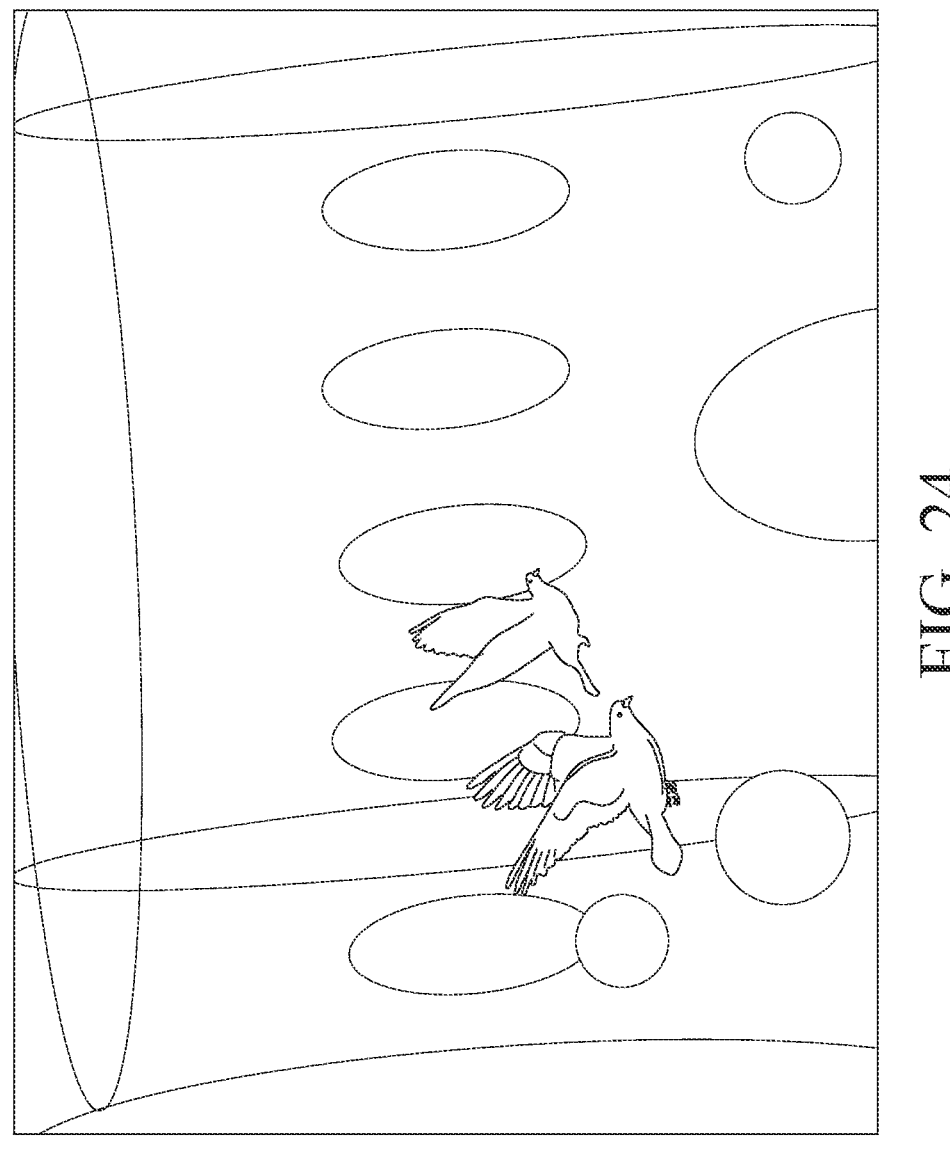
FIG. 24 shows an image captured by the electronic device using a camera module having an adjustable aperture module in FIG. 20 with an F-number of 1.4.
Figure 25:
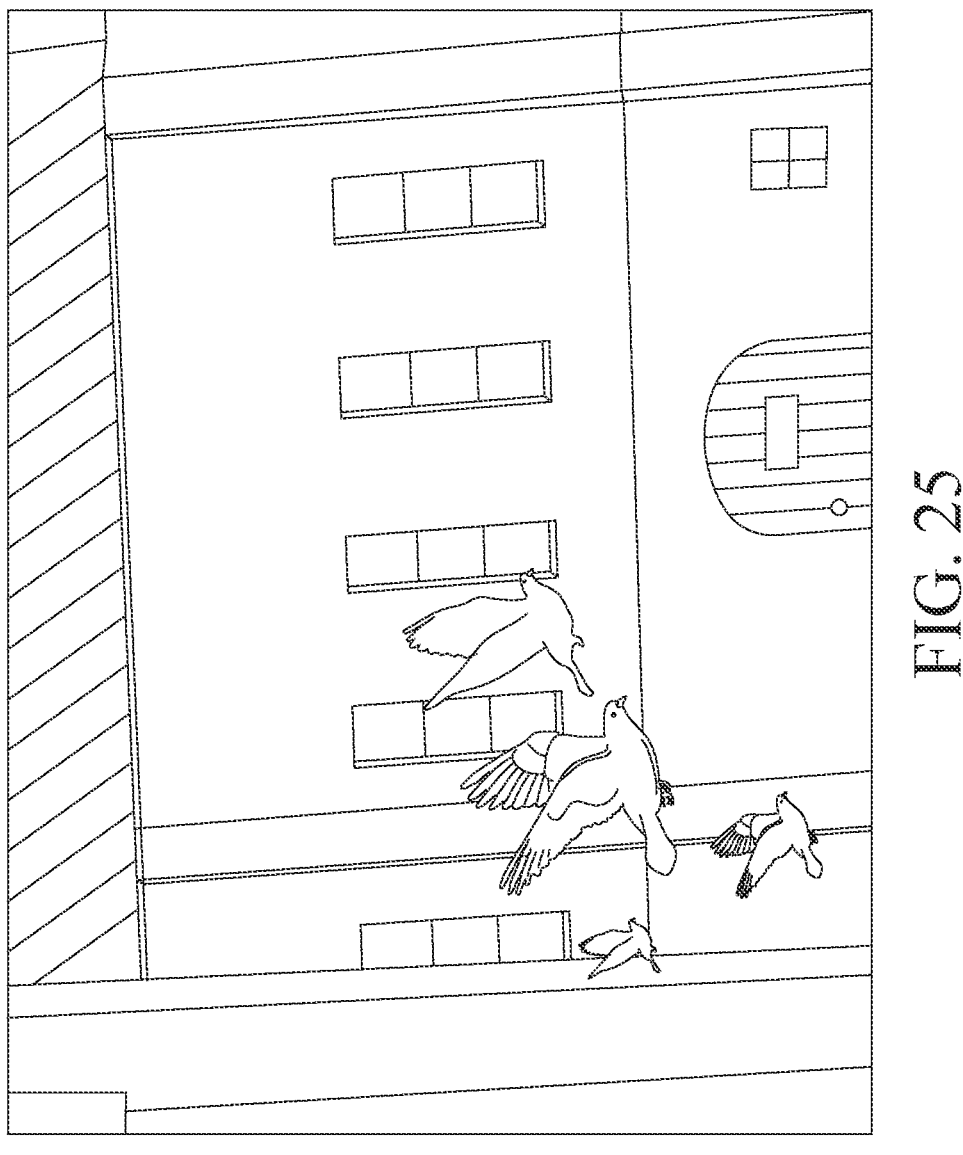
FIG. 25 shows an image captured by the electronic device using a camera module having an adjustable aperture module in FIG. 20 with an F-number of 5.6.

In this embodiment, the camera module 70a, the camera module 70b and the camera module 70c have different fields of view, such that the electronic device 7 can have various magnification ratios so as to meet the requirement of optical zoom functionality. For example, the camera module 70b has a relatively large maximum field of view, and the image captured by the camera module 70b can refer to FIG. 23, which shows an image captured by the electronic device 7 with a wide-angle camera module, and the captured image as shown in FIG. 23 includes the whole cathedral, surrounding buildings and people in front of the cathedral. The captured image as shown in FIG. 23 has a relatively large field of view and depth of view, but it often has a relatively large degree of distortion. The image captured by the camera module 70a having an adjustable aperture module with a relatively small f-number can refer to FIG. 24, and the image captured by the camera module 70a having an adjustable aperture module with a relatively large f-number can refer to FIG. 25. FIG. 24 shows an image captured by the electronic device 7 with a camera module having an adjustable aperture module with an f-number of 1.4, FIG. 25 shows an image captured by the electronic device 7 with a camera module having an adjustable aperture module with an f-number of 5.6, and the captured images as shown in FIG. 24 and FIG. 25 include birds flying in front of the cathedral. As shown in FIG. 24, when the adjustable aperture module of the camera module 70a provides a relatively large light pass aperture, the image sensor receives more light, but the background in the image is relatively blurry. As shown in FIG. 25, when the adjustable aperture module of the camera module 70a provides a relatively small light pass aperture, the image sensor receives less light, but the background in the image is relatively clear. The captured images as shown in FIG. 24 and FIG. 25 have a relatively small field of view and depth of view, and the camera module 70a having an adjustable aperture module can be used for shooting moving targets. For example, a lens driving unit can drive the lens groups of the imaging lens to quickly and continuously autofocus on the target, such that the captured image of the target would not be blurred due to long focusing distance. When imaging, the camera module 70a having an adjustable aperture module can further perform optical zoom for imaged objects so as to obtain clearer images. In addition, the camera module 70e can determine depth information of the imaged object. In this embodiment, the electronic device 7 includes multiple camera modules 70a, 70b, 70c, 70d, and 70e, but the present disclosure is not limited to the number and arrangement of camera modules.

When a user captures images of an object OBJ, light rays converge in the camera module 70a, the camera module 70b or the camera module 70c to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the camera module 70d or the camera module 70e to generate images. The electronic device 7 can include a reminder light 82 that can be illuminated to remind the user that the camera module 70d or the camera module 70e is working. The display module 75 can be a touch screen or physical buttons such as a zoom button 751 and a shutter release button 752. The user is able to interact with the display module 75 and the image software processor having multiple functions to capture images and complete image processing. The image processed by the image software processor can be displayed on the display module 75. The user can replay the previously captured image through an image playback button 753 of the display module 75, can choose a suitable camera module for shooting through a camera module switching button 754 of the display module 75, and can properly adjust shooting parameters according to current shooting situations through an integrated menu button 755 of the display module 75.

Further, the electronic device 7 further includes a circuit board 78 and a plurality of electronic components 79 disposed on the circuit board 78. The camera modules 70a, 70b, 70c, 70d, and 70e are electrically connected to the electronic component 79 via connectors 781 on the circuit board 78. The electronic components 79 can include a signal emitting module and can transmit image(s) to other electronic device or a cloud storage via the signal emitting module. Moreover, the signal emitting module can be a wireless fidelity (WiFi) module, a Bluetooth module, an infrared module, a network service module or an integrated module for transmitting various signals mentioned above, and the present disclosure is not limited thereto.

The electronic components 79 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 74, but the present disclosure is not limited thereto. In some other embodiments, the electronic components can also be integrated in the camera module or can also be disposed on one of the circuit boards. In addition, the user can use the biometric identification device 77 to turn on and unlock the electronic device 7.

The smartphone in this embodiment is only exemplary for showing the adjustable aperture module, the imaging lens module and the camera module of the present disclosure installed in an electronic device, and the present disclosure is not limited thereto. The adjustable aperture module, the imaging lens module and the camera module can be optionally applied to optical systems with a movable focus. Furthermore, the adjustable aperture module, the imaging lens module and the camera module feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multicamera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module comprising:
an imaging lens comprising an object-side lens group and an image-side lens group, and an optical axis of the imaging lens passing through the object-side lens group and the image-side lens group;
an adjustable aperture module disposed between the object-side lens group and the image-side lens group, and the adjustable aperture module comprising:
a blade assembly comprising at least two light-blocking blades overlapping one another, the at least two light-blocking blades arranged in a circumferential direction surrounding the optical axis and together forming a light pass aperture, and the optical axis passing through the light pass aperture;
a plurality of fixed shafts disposed corresponding to the blade assembly;
a movable component disposed corresponding to the blade assembly; and
a driving mechanism configured to rotate the movable component in the circumferential direction, allowing the blade assembly to move relative to the plurality of fixed shafts for varying an aperture size of the light pass aperture;
a first spacer, wherein the plurality of fixed shafts are disposed on the first spacer; and
a second spacer disposed corresponding to the first spacer;
wherein the first spacer and the second spacer are coupled to each other and together form an inner space in which the adjustable aperture module is accommodated; and
wherein the second spacer receives the object-side lens group and is in physical contact with the object-side lens group;
wherein an axial distance between the object-side lens group and the image-side lens group is T, a difference in area between a maximum size of the light pass aperture and a minimum size of the light pass aperture is ΔA, and the following condition is satisfied:

$$0.1 < T/\sqrt{\Delta A} < 0.9.$$

2. The imaging lens module of claim 1, wherein a maximum field of view of the imaging lens module is FOV, and the following condition is satisfied:

$$85 \text{ degrees} < FOV < 210 \text{ degrees}.$$

3. The imaging lens module of claim 1, wherein the adjustable aperture module further comprises:
at least one rollable element disposed between the first spacer and the movable component, wherein when the driving mechanism drives the movable component to rotate in the circumferential direction, the at least one rollable element provides the movable component with a rotational degree of freedom relative to the first spacer;
a fixed aperture element disposed between the object-side lens group and the image-side lens group, and the fixed aperture element and the blade assembly disposed adjacent to each other; and
a printed circuit board disposed corresponding to the driving mechanism and electrically connected to the driving mechanism.

4. The imaging lens module of claim 3, wherein the fixed aperture element comprises a central opening, and the optical axis passes through the central opening.

5. The imaging lens module of claim 3, wherein the driving mechanism comprises:
at least one coil disposed on the printed circuit board; and
at least one magnet disposed on the movable component.

6. The imaging lens module of claim 5, wherein the at least one rollable element and the at least one magnet are arranged along the circumferential direction, and two sides of the at least one magnet, in both a clockwise direction and a counterclockwise direction, are adjacent to the at least one rollable element.

7. The imaging lens module of claim 5, wherein a length of each of the at least one magnet in the circumferential direction is Lm, a maximum outer diameter of the movable component is Dm, and the following condition is satisfied:

$$0.1 < Lm/Dm < 0.8.$$

8. The imaging lens module of claim 1, wherein the first spacer comprises a notch structure.

9. The imaging lens module of claim 8, wherein the second spacer comprises a protruding structure, and the protruding structure and the notch structure are disposed opposite to each other.

10. The imaging lens module of claim 1, wherein the first spacer receives the image-side lens group and is in physical contact with the image-side lens group.

11. The imaging lens module of claim 1, wherein a distance between the light pass aperture and an image-side surface of a most image-side lens element in the image-side lens group in a direction parallel to the optical axis is SD, a distance between an object-side surface of a most object-side lens element in the object-side lens group and the image-side surface of the most image-side lens element in the image-side lens group in the direction parallel to the optical axis is TD, and the following condition is satisfied:

$$0 < SD/TD < 0.9.$$

12. The imaging lens module of claim 1, wherein the imaging lens further comprises:

an IR-cut coating disposed on one lens surface of one lens element of the object-side lens group.

13. The imaging lens module of claim 1, wherein one lens element of the image-side lens group is made of IR-cut material.

14. The imaging lens module of claim 1, further comprising:

a retainer disposed on an object side of the imaging lens, and the retainer is in physical contact with a most object-side lens element of the object-side lens group; and an O-ring disposed between the object-side lens group and the second spacer.

15. A camera module comprising:

the imaging lens module of claim 1; and an image sensor disposed on an image surface of the imaging lens module.

16. An electronic device comprising:

the camera module of claim 15.

17. An imaging lens module comprising:

an imaging lens comprising an object-side lens group and an image-side lens group, and an optical axis of the imaging lens passing through the object-side lens group and the image-side lens group;

an adjustable aperture module disposed between the object-side lens group and the image-side lens group, and the adjustable aperture module comprising:

a blade assembly comprising at least two light-blocking blades overlapping one another, the at least two light-blocking blades arranged in a circumferential direction surrounding the optical axis and together forming a light pass aperture, and the optical axis passing through the light pass aperture;

a plurality of fixed shafts disposed corresponding to the blade assembly;

a movable component disposed corresponding to the blade assembly; and a driving mechanism configured to rotate the movable component in the circumferential direction, allowing the blade assembly to move relative to the plurality of fixed shafts for varying an aperture size of the light pass aperture;

a first spacer, wherein the plurality of fixed shafts are disposed on the first spacer; and a second spacer disposed corresponding to the first spacer;

wherein the first spacer and the second spacer are coupled to each other and together form an inner space in which the adjustable aperture module is accommodated; and wherein the first spacer receives the image-side lens group and is in physical contact with the image-side lens group;

wherein an axial distance between the object-side lens group and the image-side lens group is T, a difference in area between a maximum size of the light pass aperture and a minimum size of the light pass aperture is ΔA, and the following condition is satisfied:

$$0.1 < T/\sqrt{\Delta A} < 0.9.$$

18. The imaging lens module of claim 17, wherein a maximum field of view of the imaging lens module is FOV, and the following condition is satisfied:

$$85 \text{ degrees} < FOV < 210 \text{ degrees}.$$

19. The imaging lens module of claim 17, wherein the adjustable aperture module further comprises:

at least one rollable element disposed between the first spacer and the movable component, wherein when the driving mechanism drives the movable component to rotate in the circumferential direction, the at least one rollable element provides the movable component with a rotational degree of freedom relative to the first spacer;

a fixed aperture element disposed between the object-side lens group and the image-side lens group, and the fixed aperture element and the blade assembly disposed adjacent to each other; and a printed circuit board disposed corresponding to the driving mechanism and electrically connected to the driving mechanism.

20. The imaging lens module of claim 19, wherein the fixed aperture element comprises a central opening, and the optical axis passes through the central opening.

21. The imaging lens module of claim 17, wherein the first spacer comprises a notch structure.

22. The imaging lens module of claim 21, wherein the second spacer comprises a protruding structure, and the protruding structure and the notch structure are disposed opposite to each other.

23. The imaging lens module of claim 19, wherein the driving mechanism comprises:

at least one coil disposed on the printed circuit board; and at least one magnet disposed on the movable component.

24. The imaging lens module of claim 23, wherein the at least one rollable element and the at least one magnet are arranged along the circumferential direction, and two sides of the at least one magnet, in both a clockwise direction and a counterclockwise direction, are adjacent to the at least one rollable element.

25. The imaging lens module of claim 23, wherein a length of each of the at least one magnet in the circumferential direction is Lm, a maximum outer diameter of the movable component is Dm, and the following condition is satisfied:

$$0.1 < Lm/Dm < 0.8.$$

26. The imaging lens module of claim 17, wherein a distance between the light pass aperture and an image-side surface of a most image-side lens element in the image-side lens group in a direction parallel to the optical axis is SD, a distance between an object-side surface of a most object-side lens element in the object-side lens group and the image-side surface of the most image-side lens element in the image-side lens group in the direction parallel to the optical axis is TD, and the following condition is satisfied:

$$0 < SD/TD < 0.9.$$

27. The imaging lens module of claim 17, wherein the imaging lens further comprises:

an IR-cut coating disposed on one lens surface of one lens element of the object-side lens group.

28. The imaging lens module of claim 17, wherein one lens element of the image-side lens group is made of IR-cut material.

29. The imaging lens module of claim 17, further comprising:

a retainer disposed on an object side of the imaging lens, and the retainer is in physical contact with a most object-side lens element of the object-side lens group; and an O-ring disposed between the object-side lens group and the second spacer.

\* \* \* \* \*